US010520933B2

(12) United States Patent
Stone et al.

(10) Patent No.: US 10,520,933 B2
(45) Date of Patent: Dec. 31, 2019

(54) SYSTEM AND METHOD FOR REMOVING A WORKPIECE FROM A MANUFACTURING FIXTURE

(71) Applicant: The Boeing Company, Chicago, IL (US)

(72) Inventors: Patrick B. Stone, Monroe, WA (US); Matthew Benjamin Moore, Edmonds, WA (US); Jeffrey A. Zornes, Everett, WA (US)

(73) Assignee: The Boeing Company, Chicago, IL (US)

( * ) Notice: Subject to any disclaimer, the term of this patent is extended or adjusted under 35 U.S.C. 154(b) by 146 days.

(21) Appl. No.: 15/952,607

(22) Filed: Apr. 13, 2018

(65) Prior Publication Data

US 2019/0317482 A1 Oct. 17, 2019

(51) Int. Cl.
G05B 19/418 (2006.01)
B64F 5/10 (2017.01)
(Continued)

(52) U.S. Cl.
CPC ......... *G05B 19/4189* (2013.01); *B23Q 1/525* (2013.01); *B23Q 1/626* (2013.01);
(Continued)

(58) Field of Classification Search
CPC .......... B23Q 1/525; B23Q 1/626; B23Q 1/66; B23Q 1/70; B23Q 3/063; B23Q 3/08;
(Continued)

(56) References Cited

U.S. PATENT DOCUMENTS 3,795,324 A * 3/1974 Kiwalle .................. B23K 20/12
414/680
4,454,645 A * 6/1984 Schissler ................ B23B 39/16
29/563
(Continued)

FOREIGN PATENT DOCUMENTS

BE 102007060029 6/2009
CN 201971535 9/2011
(Continued)

OTHER PUBLICATIONS

Anver, "Anver Suction Cups and Vacuum Cups," available at <http://anver.com/vacuum-components/vacuum-cups/cups-vc253545/?>, retrieved on Apr. 13, 2018.
(Continued)

Primary Examiner — Crystal J Barnes-Bullock

(57) ABSTRACT

A flay assembly for separating a workpiece from a manufacturing fixture has a horizontal beam assembly and a pair of vertical beam assemblies. The horizontal beam assembly includes a horizontal beam having a horizontal drive motor. Each vertical beam assembly includes a vertical beam operably engaged to the horizontal drive motor and has a workpiece attachment assembly operably engaged to a vertical drive motor. The workpiece attachment assembly has an attachment mechanism attachable to the workpiece. The horizontal drive motor and the vertical drive motors are operable in a manner to move the vertical beams away from each other along a horizontal drive axis while simultaneously moving each workpiece attachment assembly along a vertical drive axis to cause the attachment mechanisms to pull the workpiece side portions away from the manufacturing fixture while a center support of the horizontal beam maintains a workpiece crown in contact with the manufacturing fixture.

20 Claims, 22 Drawing Sheets

(51) Int. Cl.
*B25J 15/06* (2006.01)
*B23Q 1/52* (2006.01)
*B23Q 1/66* (2006.01)
*B23Q 39/02* (2006.01)
*B23Q 1/62* (2006.01)
*B23Q 3/06* (2006.01)
*B23Q 3/08* (2006.01)
*B23Q 1/70* (2006.01)
*B25B 5/14* (2006.01)
*B25B 5/16* (2006.01)
*B25B 11/00* (2006.01)

(52) U.S. Cl.
CPC ............ *B23Q 1/66* (2013.01); *B23Q 1/70* (2013.01); *B23Q 3/063* (2013.01); *B23Q 3/08* (2013.01); *B23Q 39/028* (2013.01); *B25B 5/14* (2013.01); *B25B 5/16* (2013.01); *B25B 11/005* (2013.01); *B25J 15/0616* (2013.01); *B64F 5/10* (2017.01); *G05B 2219/35191* (2013.01); *Y10T 29/49* (2015.01); *Y10T 29/5124* (2015.01); *Y10T 29/5136* (2015.01); *Y10T 82/2514* (2015.01); *Y10T 409/304088* (2015.01); *Y10T 409/309576* (2015.01)

(58) Field of Classification Search
CPC .......... B23Q 39/028; B25B 5/14; B25B 5/16; B25B 11/005; Y10T 29/49; Y10T 29/5136; Y10T 29/5124; Y10T 82/2514; Y10T 409/304088; Y10T 409/309576; G05B 19/4189; B25J 15/0616; B64F 5/10
See application file for complete search history.

(56) References Cited

U.S. PATENT DOCUMENTS

| | | | | |
|---|---|---|---|---|
| 4,603,716 A * | 8/1986 | Rhodes | B23Q 1/52 | 144/134.1 |
| 4,666,363 A * | 5/1987 | Johansson | B23K 37/0452 | 198/378 |
| 4,750,723 A * | 6/1988 | Pace | B25B 5/061 | 269/310 |
| 4,836,518 A * | 6/1989 | Janutta | B23Q 3/063 | 269/37 |
| 5,225,650 A * | 7/1993 | Babel | B23K 26/0823 | 219/121.69 |
| 6,637,737 B1 * | 10/2003 | Beecherl | B23Q 1/5406 | 269/289 R |
| 6,785,942 B2 * | 9/2004 | Koike | B23Q 1/52 | 29/33 P |
| 6,786,686 B1 * | 9/2004 | Koike | B23Q 1/40 | 29/33 P |
| 6,851,358 B2 * | 2/2005 | Gawlitta | B30B 15/04 | 100/194 |
| 6,874,213 B2 * | 4/2005 | Prust | B23Q 1/623 | 29/27 C |
| 7,008,152 B2 * | 3/2006 | Geiger | B23Q 1/017 | 29/27 C |
| 7,051,870 B2 * | 5/2006 | Schoendienst | B65G 17/066 | 198/801 |
| 7,918,440 B2 * | 4/2011 | Schiavi | B25B 11/005 | 269/20 |
| 8,850,685 B2 * | 10/2014 | Craythorn | B21J 15/32 | 29/524.1 |
| 9,789,513 B2 * | 10/2017 | Feuerstein | B05C 13/02 | |
| 2005/0008469 A1 | 1/2005 | Jung | | |
| 2015/0122413 A1 | 5/2015 | Inserra | | |

FOREIGN PATENT DOCUMENTS

| | | |
|---|---|---|
| EP | 2631062 | 8/2013 |
| JP | 2012152840 | 8/2012 |

OTHER PUBLICATIONS

European Patent Office, EESR for Appl. No. 19167769.9, dated Aug. 21, 2019.

* cited by examiner

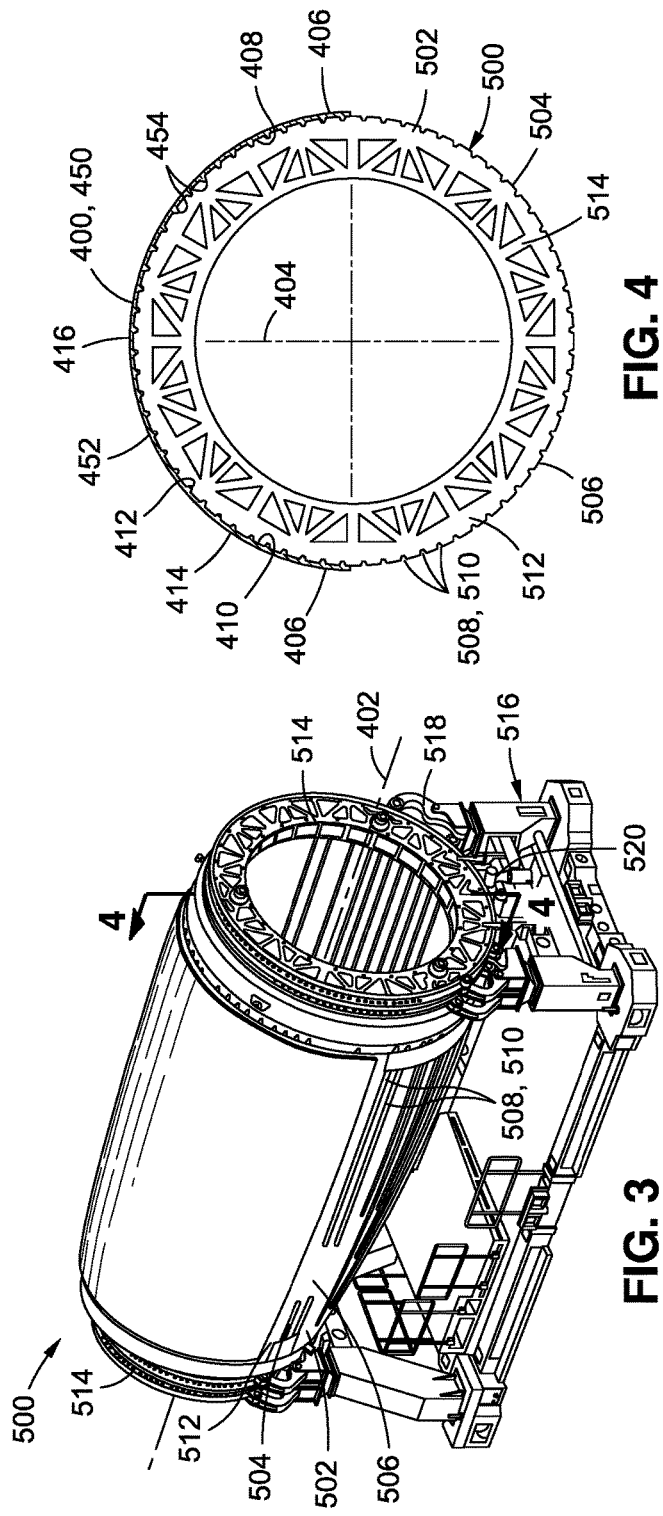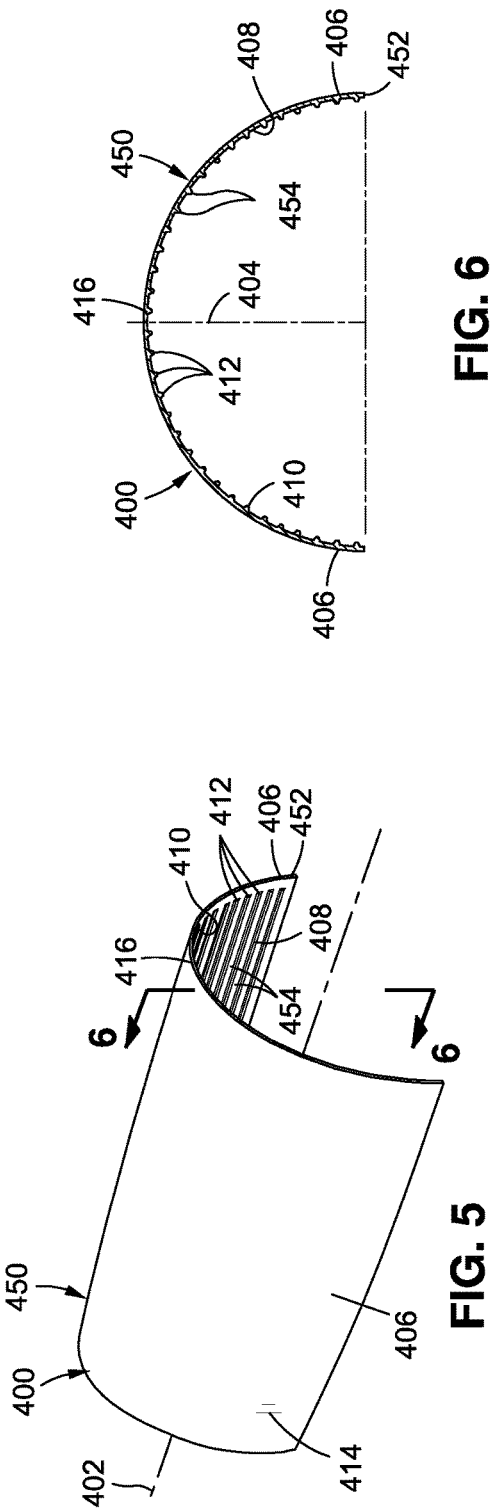

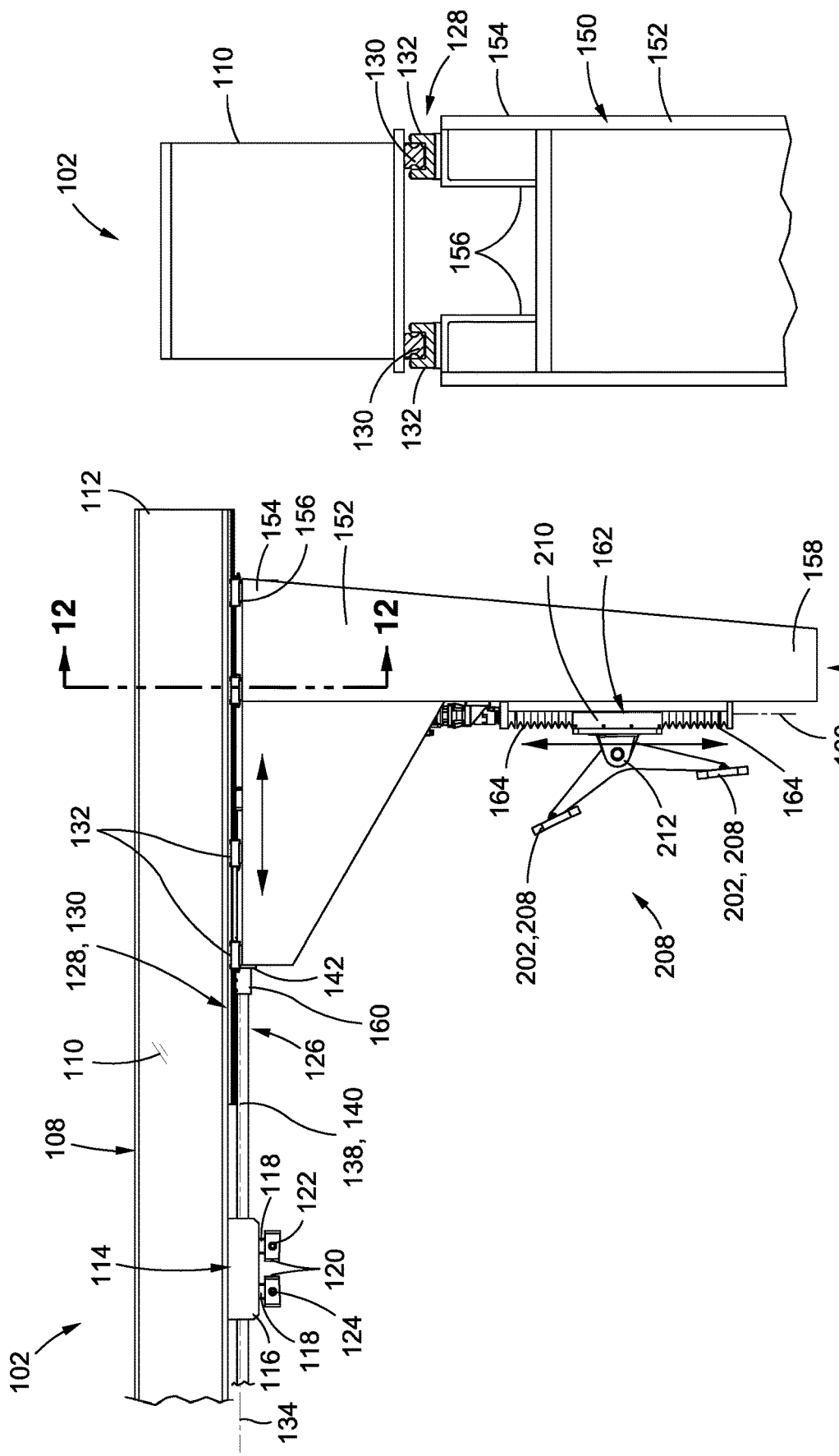

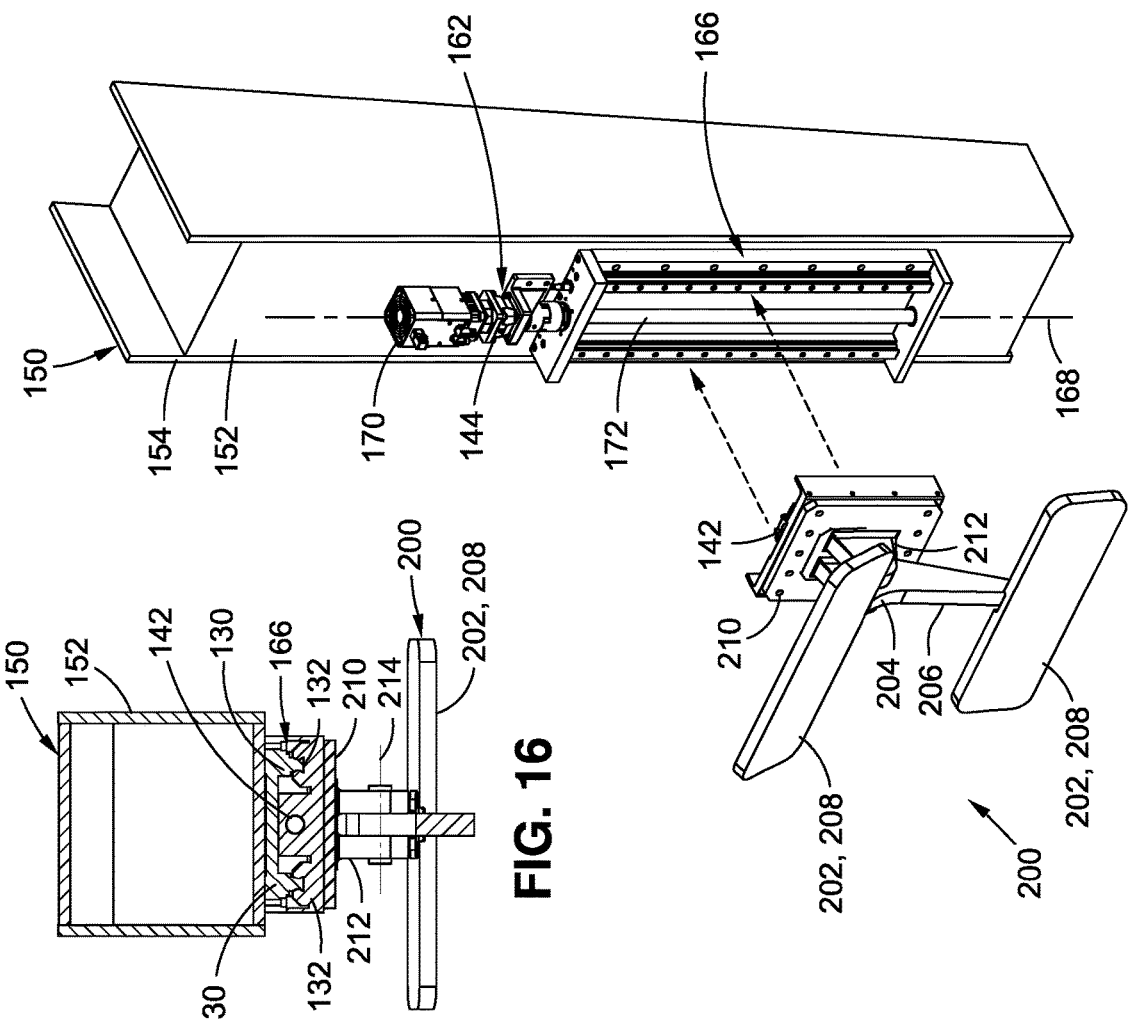
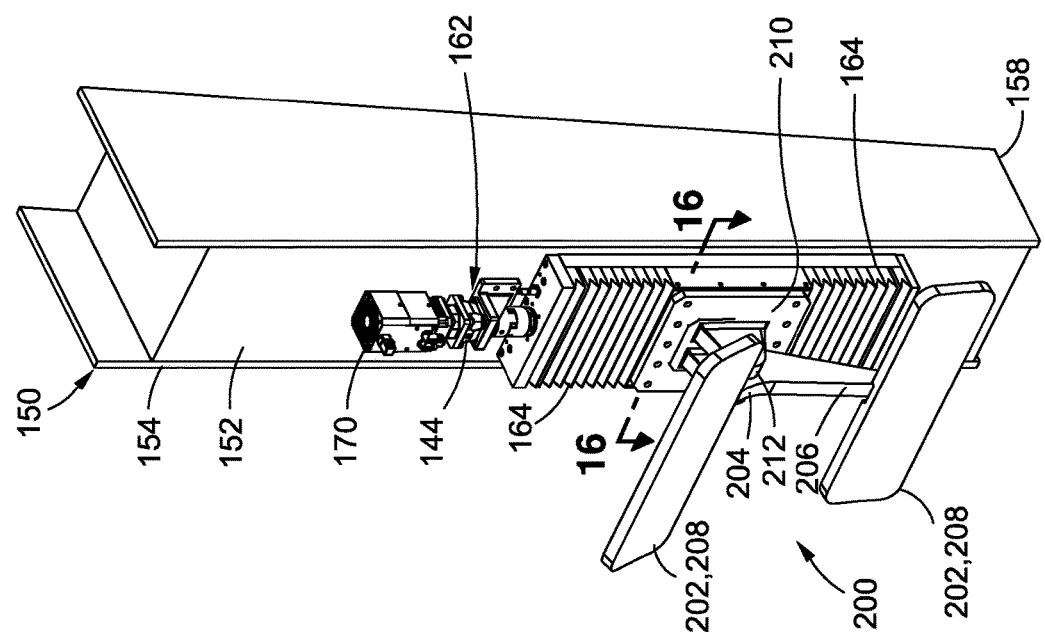

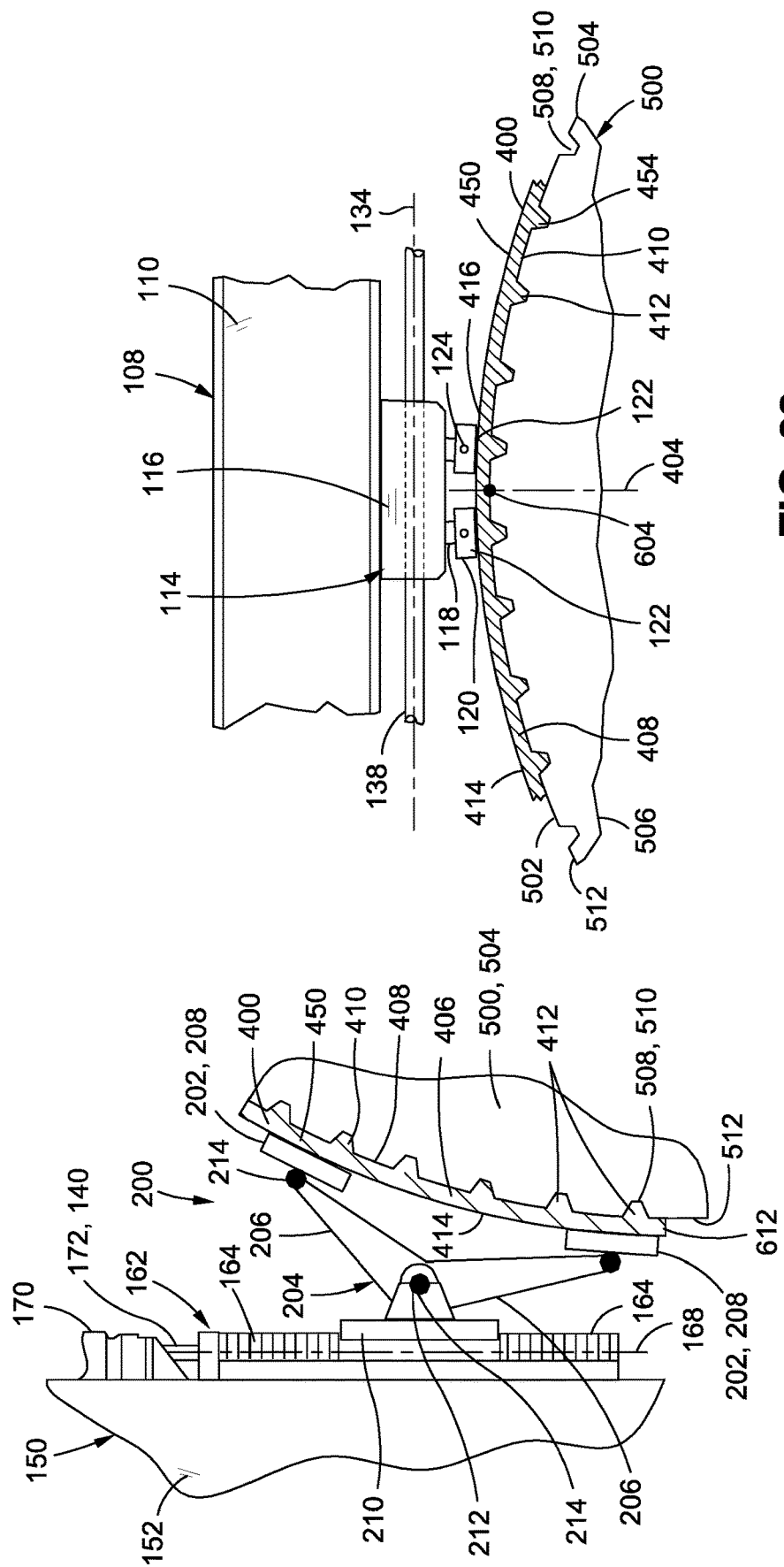

800

802 — POSITIONING A CENTER SUPPORT OF A HORIZONTAL BEAM ASSEMBLY OF AT LEAST ONE FLAY ASSEMBLY OF A FLAY SYSTEM INTO CONTACT WITH A WORKPIECE CROWN OF A WORKPIECE SUPPORTED ON A MANUFACTURING FIXTURE

↓

804 — REMOVABLY ATTACHING A PAIR OF ATTACHMENT MECHANISMS RESPECTIVELY TO OPPOSING WORKPIECE SIDE PORTIONS OF THE WORKPIECE, EACH ATTACHMENT MECHANISM BEING MOVABLY COUPLED TO A VERTICAL BEAM TRACK SYSTEM AND OPERABLY ENGAGED TO A VERTICAL DRIVE MOTOR OF A VERTICAL BEAM ASSEMBLY MOVABLY COUPLED TO A HORIZONTAL BEAM TRACK SYSTEM AND OPERABLY ENGAGED TO A HORIZONTAL DRIVE MOTOR OF THE HORIZONTAL BEAM ASSEMBLY

↓

806 — OPERATING THE HORIZONTAL DRIVE MOTOR AND THE VERTICAL DRIVE MOTORS IN A COORDINATED MANNER TO MOVE THE VERTICAL BEAM ASSEMBLIES AWAY FROM EACH OTHER ALONG A HORIZONTAL DRIVE AXIS WHILE SIMULTANEOUSLY MOVING EACH WORKPIECE ATTACHMENT ASSEMBLY ALONG A CORRESPONDING VERTICAL DRIVE AXIS TO CAUSE THE PAIR OF WORKPIECE ATTACHMENT ASSEMBLIES TO OUTWARDLY DEFLECT THE WORKPIECE SIDE PORTIONS AWAY FROM THE MANUFACTURING FIXTURE WHILE THE CENTER SUPPORT MAINTAINS THE WORKPIECE CROWN IN CONTACT WITH THE MANUFACTURING FIXTURE

FIG. 30

SYSTEM AND METHOD FOR REMOVING A WORKPIECE FROM A MANUFACTURING FIXTURE

FIELD

The present disclosure relates generally to manufacturing and, more particularly, to a system and method for removing a workpiece from a manufacturing fixture.

BACKGROUND

The manufacturing of a barrel section of an aircraft fuselage may involve placing a plurality of uncured or precured composite stringers in a corresponding plurality of grooves extending axially along a surface of a rotatable layup mandrel. Multiple plies of composite material may then be laid up over the layup mandrel and stringers as the layup mandrel is rotated to form a skin over the stringers. After layup is complete, the layup mandrel may be moved into an autoclave for applying heat and pressure to the composite material for co-curing or co-bonding the skin and stringers together to form a cured composite barrel section. The barrel section may be cut along an axial direction on each of opposing sides of the layup mandrel to form a pair of relatively rigid, semi-cylindrical skin panels.

The engagement of the stringers within the grooves may prevent each skin panel from being lifted off of the layup mandrel. Removal of the skin panels may therefore require disassembly of the mandrel body which may be formed of a plurality of mandrel sections. However, disassembling the layup mandrel can be a time-consuming operation. In addition, forming the layup mandrel as a plurality of mandrel sections can add to the cost and complexity of the layup mandrel.

As can be seen, there exists a need in the art for a system and method of removing a workpiece (e.g., a skin panel) from a manufacturing fixture (e.g., a layup mandrel) that avoids the need for disassembling the manufacturing fixture.

SUMMARY

The above-noted needs associated with removing a workpiece from a manufacturing fixture are specifically addressed by the present disclosure which provides a flay system having at least one flay assembly. The flay assembly includes a horizontal beam assembly and a pair of vertical beam assemblies mounted to the horizontal beam assembly in spaced relation to each other. The horizontal beam assembly includes a horizontal beam having a center support. In addition, the horizontal beam assembly includes at least one horizontal drive mechanism mounted to the horizontal beam and having a horizontal drive motor and a horizontal beam track system defining a horizontal drive axis. Each one of the vertical beam assemblies includes a vertical beam coupled to the horizontal beam track system and operably engaged to the horizontal drive motor for driving the vertical beam assembly along the horizontal drive axis. Each one of the vertical beam assemblies also includes a vertical drive mechanism mounted to the vertical beam and having a vertical drive motor and a vertical beam track system defining a vertical drive axis. Each one of the vertical beam assemblies additionally includes a workpiece attachment assembly coupled to the vertical beam track system and operably engaged to the vertical drive motor for driving the workpiece attachment assembly along the vertical drive axis. Each workpiece attachment assembly includes an attachment mechanism configured to be removably attached to one of opposing workpiece side portions of a workpiece supported on a manufacturing fixture. The horizontal drive motor and the vertical drive motors are configured to operate in a coordinated manner to move the vertical beams away from each other along the horizontal drive axis while simultaneously moving each workpiece attachment assembly along a corresponding vertical drive axis to cause the attachment mechanisms to pull the workpiece side portions away from the manufacturing fixture while the center support maintains a workpiece crown in contact with the manufacturing fixture.

Also disclosed is a method of separating a workpiece from a manufacturing fixture. The method includes positioning a center support of a horizontal beam assembly of at least one flay assembly of a flay system into contact with a workpiece crown of a workpiece having an inner surface geometry supported on a manufacturing fixture. In addition, the method includes removably attaching a pair of attachment mechanisms of a corresponding pair of workpiece attachment assemblies respectively to opposing workpiece side portions of the workpiece. Each workpiece attachment assembly is movably coupled to a vertical beam track system and operably engaged to a vertical drive motor of a vertical beam assembly movably. Each vertical beam assembly movably is movably coupled to a horizontal beam track system of the horizontal beam assembly and is operably engaged to a horizontal drive motor of the horizontal beam assembly. The method also includes operating the horizontal drive motor and the vertical drive motors in a coordinated manner to move the vertical beam assemblies away from each other along a horizontal drive axis while simultaneously moving each workpiece attachment assembly along a corresponding vertical drive axis to cause the pair of workpiece attachment assemblies to outwardly deflect the workpiece side portions away from the manufacturing fixture while the center support of the horizontal beam assembly maintains the workpiece crown in contact with the manufacturing fixture.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a perspective view of the layup mandrel of FIG. 2 showing a skin panel supported on the layup mandrel;

FIG. 4 is an end view of the layup mandrel showing a plurality of stringers of the skin panel received within grooves formed in a layup surface of the layup mandrel;

FIG. 5 is a perspective view of the skin panel showing the stringers protruding inwardly from the skin inner surface of the skin panel;

FIG. 6 is an end view of the skin panel of FIG. 5 showing the inwardly protruding stringers;

FIG. 11 is a front view of a portion of a horizontal beam assembly and one of the vertical beam assemblies;

FIG. 12 is a sectional view taken along line 12 of FIG. 11 and illustrating the vertical beam assembly slidably coupled to a horizontal beam track system of the horizontal beam assembly;

FIG. 14 is a perspective view of an example of a vertical beam assembly having a vertical beam drive motor for driving a workpiece attachment assembly along a vertical beam track system;

FIG. 15 is a partially exploded perspective view of the vertical beam assembly of FIG. 14 showing an example of a vertical beam track system and a vertical drive shaft coupled to a vertical drive motor for driving the workpiece attachment assembly along the vertical beam track system;

FIG. 16 is a sectional view taken along line 16 of FIG. 14 and illustrating the workpiece attachment assembly slidably coupled to the vertical beam track system;

FIG. 21 is a magnified view of a portion of the vertical beam assembly of FIG. 20 showing the attachment mechanisms configured as a pair of vacuum plates for vacuum attachment to the workpiece side portions;

FIG. 22 is a magnified view of a portion of the horizontal beam assembly of FIG. 20 showing a center support of the horizontal beam placed in contact with the workpiece outer surface;

FIG. 30 is a flowchart including operations of a method of removing a workpiece from a manufacturing fixture using a flay system.

DETAILED DESCRIPTION

Figure 1:
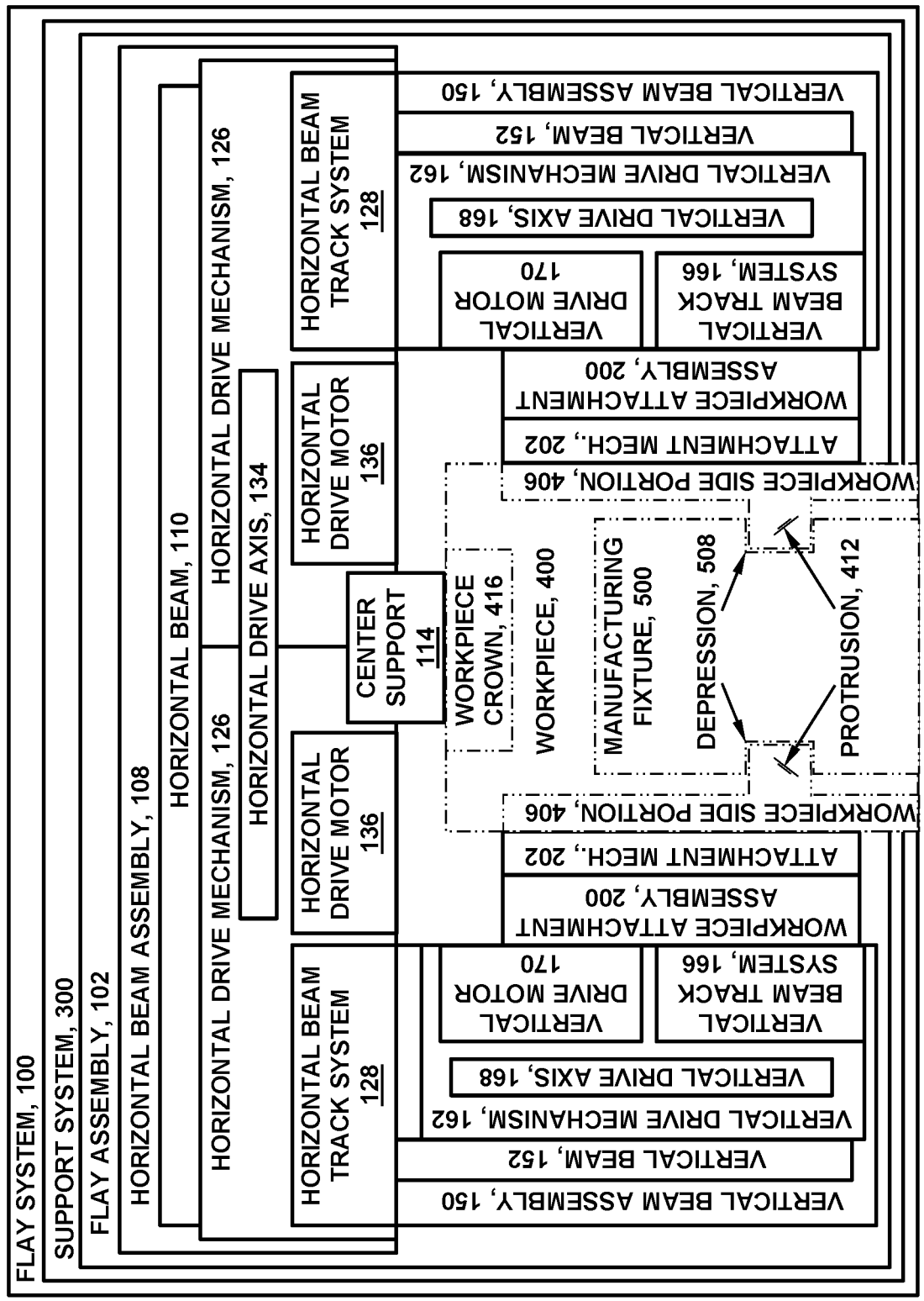
FIG. 1 is a block diagram of a flay system for removing a workpiece supported on a manufacturing fixture.

Referring now to the drawings wherein the showings are for purposes of illustrating preferred and various examples of the disclosure, shown in FIG. 1 is a block diagram of a flay system 100 for removing a workpiece 400 from a manufacturing fixture 500. In the present disclosure, the flay system 100 is described in the context of removing a composite skin panel 450 (e.g., FIG. 3-6) from a layup mandrel 504 (e.g., FIG. 2-4). However, the presently-disclosed flay system 100 may be implemented for removing any one a variety of different types of workpieces from any one of a variety of different types of manufacturing fixtures, and is not limited to removing a composite skin panel 450 from a layup mandrel 504.

Figure 10:
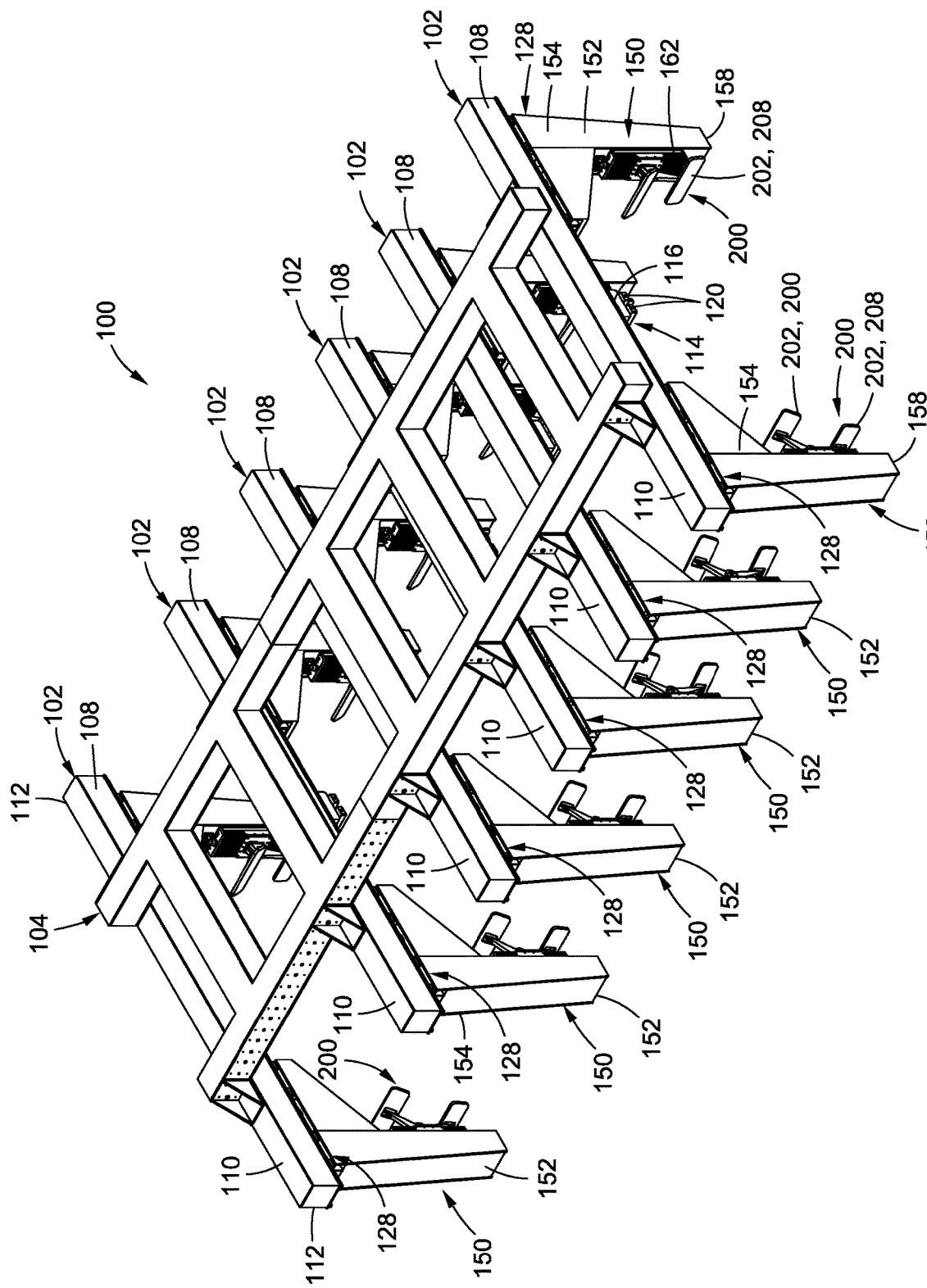
FIG. 10 is a perspective view of an example of a plurality of flay assemblies interconnected by a backbone frame and wherein each flay assembly has a horizontal beam assembly and a pair of vertical beam assemblies.

In FIG. 1, the flay system 100 may include at least one flay assembly 102. For example, as shown in FIG. 10, the flay system 100 includes a plurality of flay assemblies 102 arranged in spaced parallel relation to each other and interconnected by a backbone frame 104. Each one of the flay assemblies 102 includes a horizontal beam assembly 108 and a pair of vertical beam assemblies 150. The pair of vertical beam assemblies 150 are mounted to the horizontal beam assembly 108 in spaced relation to each other as shown in FIG. 10. Each horizontal beam assembly 108 includes a horizontal beam 110 having a center support 114 (e.g., FIG. 22). In addition, each horizontal beam assembly 108 includes at least one horizontal drive mechanism 126 (e.g., FIG. 13) mounted to the horizontal beam 110. The horizontal drive mechanism 126 has a horizontal drive motor 136 and a horizontal beam track system 128 which defines a horizontal drive axis 134 (e.g., FIG. 11) along which the vertical beam assemblies 150 are driven by the horizontal drive motor 136.

Referring still to FIG. 1, each one of the vertical beam assemblies 150 includes a vertical beam 152 which has a vertical beam top portion 154 (e.g., FIG. 11) and a vertical beam bottom portion 158 (e.g., FIG. 11). The vertical beam top portion 154 of each vertical beam 152 is coupled to the horizontal beam track system 128 (e.g., FIGS. 11-13). In addition, the vertical beam top portion 154 of each vertical beam 152 is operably engaged (e.g., FIG. 13) to the horizontal drive motor 136 for driving the vertical beam assembly 150 along the horizontal drive axis 134. Each vertical beam assembly 150 further includes a vertical drive mechanism 162 mounted to the vertical beam 152. The vertical beam 152 drive mechanism has a vertical drive motor 170 and a vertical beam track system 166 which defines a vertical drive axis 168 (e.g., FIGS. 14-15). Each vertical beam assembly 150 further includes a workpiece attachment assembly 200 which is coupled to the vertical beam track system 166 (e.g., FIGS. 15-16 and 18) and is operably engaged (e.g., FIG. 18) to the vertical drive motor 170 for driving the workpiece attachment assembly 200 along the vertical drive axis 168.

In FIG. 1, each workpiece attachment assembly 200 includes an attachment mechanism 202 (e.g., FIGS. 17-18) configured to be removably attached to one of opposing workpiece side portions 406 of a workpiece 400 supported on the manufacturing fixture 500. The workpiece 400 may have an inner surface geometry 410 (e.g., FIGS. 5-6) that may be engaged to the fixture outer surface 502 (e.g., FIGS. 3-4) of the manufacturing fixture 500. The inner surface geometry 410 may include one or more protrusions 412 (e.g., FIGS. 5-6) that may be received within one or more depressions 508 (e.g., FIGS. 3-4) that may be formed in the fixture outer surface 502 of the manufacturing fixture 500. Alternatively or additionally, in an embodiment not shown, the workpiece may have an inner surface geometry that may include one or more depressions (not shown) that may be configured to receive one or more protrusions (not shown) that may protrude outwardly from the fixture outer surface of a manufacturing fixture. Regardless of whether the workpiece 400 and/or the manufacturing fixture 500 has protrusions 412 and/or depressions 508, the engagement of the protrusions 412 with the depressions 508 may interfere with removal of the workpiece 400 from the manufacturing fixture 500. In still further examples not shown, the workpiece 400 and/or the manufacturing fixture 500 may be devoid of protrusions 412 and/or depressions 508. However, the geometry of the workpiece 400 and/or the geometry of the manufacturing fixture 500 may interfere with the removal of the workpiece 400 from the manufacturing fixture 500. For example, the workpiece 400 may have a concave shape that may prevent removal of the workpiece 400 from a convexly-shaped manufacturing fixture upon which the workpiece 400 is supported.

Referring still to FIG. 1, for each of the one or more flay assemblies 102 that may be included in a flay system 100, the one or more horizontal drive motors 136 of the horizontal beam assemblies and the vertical drive motors 170 respectively of the vertical beam assemblies 150 are configured to be operated in a coordinated manner to move the vertical beams 152 away from each other (using the horizontal drive motors 136) along the horizontal drive axis 134 while simultaneously moving the workpiece attachment assemblies 200 along the corresponding vertical drive axes 168 (using the vertical drive motors 170) to cause the attachment mechanisms 202 on each side of the workpiece 400 to pull the workpiece side portions 406 away from the manufacturing fixture 500 while the center support 114 of the horizontal beam 110 maintains the workpiece crown 416 in contact with the manufacturing fixture 500, as shown in FIGS. 22-25 and described in greater detail below. The coordinated operation of the horizontal drive motors 136 and vertical drive motors 170 causes the workpiece attachment assemblies 200 to spread apart the workpiece side portions 406 such that the workpiece 400 transitions from an undeflected state 612 (e.g., FIG. 20-21) to a deflected state 614 (e.g., FIGS. 23-24) while the center support 114 maintains the workpiece crown 416 in contact with the manufacturing fixture 500 (e.g., FIG. 22). In this regard, the center portion prevents the workpiece crown 416 from lifting off of the manufacturing fixture 500 during outward deflection of the workpiece side portions 406. In addition, the center support 114 defines the center of rotation 604 (FIGS. 22-23) about which the workpiece side portions 406 are outwardly deflected.

The movement of the workpiece attachment assemblies 200 may outwardly deflect the workpiece side portions 406 at least until a clearance (e.g., shown exaggerated in FIGS. 23-24) exists between the workpiece side portion 406 and the fixture outer surface 502 on each of opposing sides of the manufacturing fixture 500. In this regard, the workpiece side portions 406 may be outwardly deflected by an amount that allows for separation and/or translation of the workpiece 400 away from the manufacturing fixture 500 as shown in FIG. 25 and described in greater detail below. In some examples, the removal of the workpiece 400 from the manufacturing fixture 500 may be performed while the horizontal drive mechanism 126 and vertical drive mechanisms 162 are inactive and the vertical beam assemblies 150 and the workpiece attachment assemblies 200 are stationary. After the workpiece 400 is clear of the manufacturing fixture 500, the horizontal drive mechanisms 126 and vertical drive mechanisms 162 may be operated in a manner to reverse the direction of the vertical beam assemblies 150 and workpiece attachment assemblies 200 in a manner to move the workpiece side portions 406 back to their initial positions 608 such that the workpiece 400 returns to the undeflected state 612 (e.g., FIGS. 20-21), at which point the workpiece 400 may be loaded onto a support fixture (not shown) and the attachment mechanisms 202 of the flay system 100 may be released from the workpiece 400.

Figure 2:
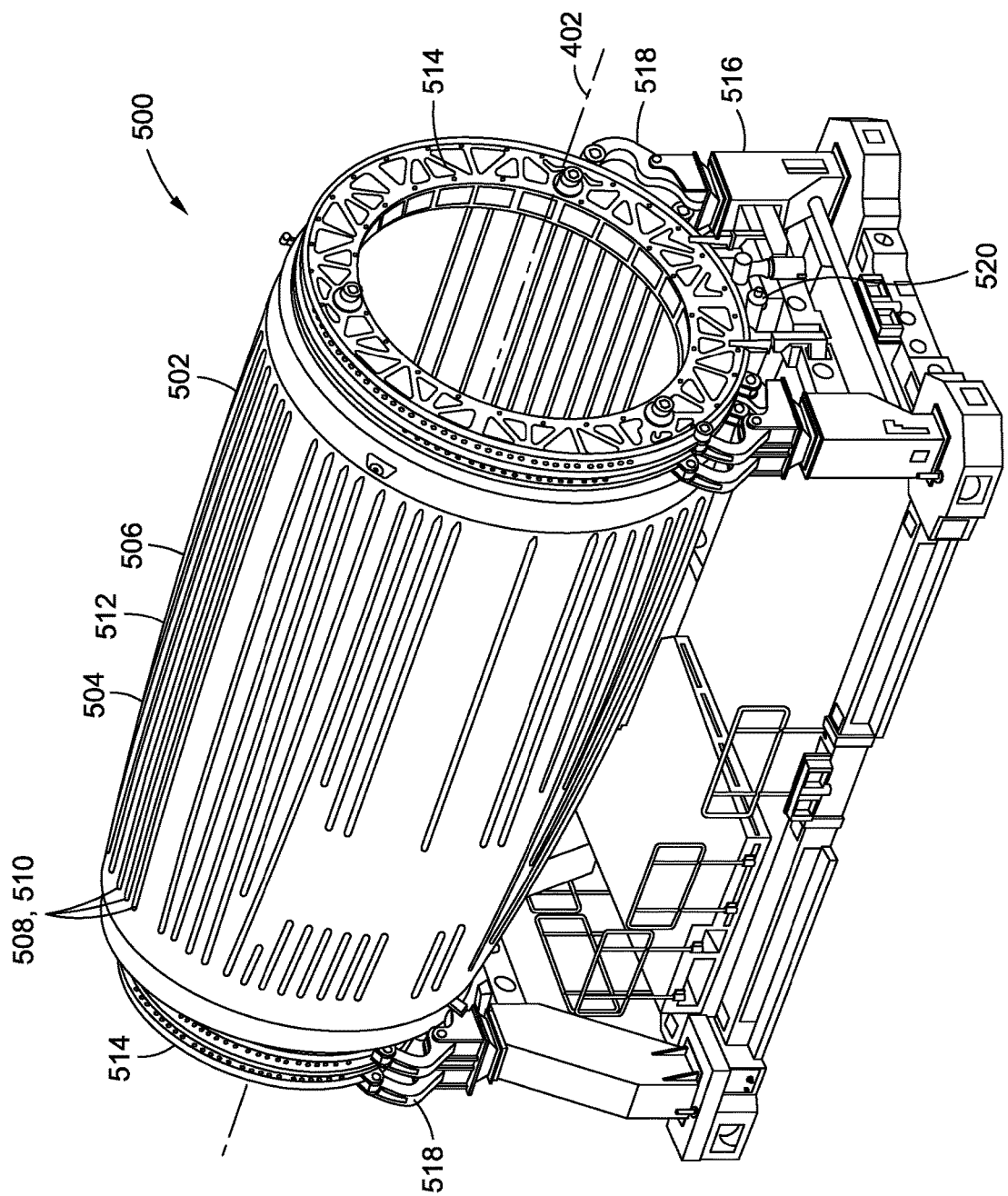
FIG. 2 a perspective view of an example of a manufacturing fixture configured as a layup mandrel upon which a skin panel may be laid up and cured.

Referring to FIG. 2-6, shown is an example of a manufacturing fixture 500 configured as a layup mandrel 504 for supporting a workpiece 400 configured as a cured composite skin panel 450. The presently-disclosed flay system 100 is described in the context of removing the composite skin panel 450 from the layup mandrel 504. FIG. 2 shows an example of the layup mandrel 504 upon which the skin panel 450 may be laid up and cured. The layup mandrel 504 may have a mandrel body 506 that is monolithic (i.e., one-piece) and which is supported by a pair of end rings 514. Each one of the end rings 514 may be supported on a fixture base 516. The fixture base 516 may include a ring cradle 518 at each end of the mandrel body 506 for rotatably supporting the mandrel body 506. The layup mandrel 504 may include one or more rotator motors 520 for rotating the mandrel body 506 during layup of the composite skin panel 450. The mandrel body 506 may include a plurality of depressions 508 or grooves 510 oriented along a lengthwise direction of the layup mandrel 504. Each one of the grooves 510 may be configured to receive an uncured or precured composite stringer which may be separately laid up on a stringer layup tool (not shown) prior to installation of the stringers 454 within the grooves 510. Although shown as having a trapezoidal cross-sectional shape (e.g., FIG. 21-22), the stringers 454 may have a cross-sectional shape that is square, rectangular, triangular, semi-circular, or any one of a variety of other cross-sectional shapes.

After the stringers 454 are installed in the grooves 510 of the layup mandrel 504, one or more plies of composite material may be laid up over the stringers 454 and mandrel outer surface 512 to form the skin element 452. For example, the layup mandrel 504 may be rotated (e.g., via the rotator motors 520) during the application of unidirectional composite tape (not shown) over the stringers 454 and mandrel outer surface 512 to form an uncured composite barrel section (not shown). The layup mandrel 504 may then be moved into an autoclave (not shown) for co-curing or co-bonding of the skin element 452 and stringers 454 at an elevated temperature and/or pressure to form a cured composite barrel section having a generally cylindrical shape. After removal of the layup mandrel 504 from the autoclave, the cured composite barrel section may be cut along a lengthwise direction on each of diametrically opposite sides of the layup mandrel 504 to form a pair of skin panels 450 each having a generally semi-cylindrical shape.

FIG. 3 is a perspective view of the layup mandrel 504 showing one of the skin panels 450 having a semi-cylindrical shape supported on the layup mandrel 504. FIG. 4 is an end view of the layup mandrel 504 showing the skin panel 450 stringers 454 nested within the grooves 510 in the mandrel body 506. FIGS. 5-6 show the skin panel 450 separated from the layup mandrel 504 and illustrating the stringers 454 protruding inwardly the skin inner surface of the skin panel 450. A plurality of the skin panels 450 may be assembled to form a fuselage of an aircraft (not shown). The cured skin panel 450 may be relatively stiff and resistant to deflection in the out-of-plane direction. As described below, the flay system 100 advantageously may be operated in a manner to upwardly deflect the opposing workpiece side portions 406 of the skin panel 450 in a controlled manner along a predetermined deflection path and at a predetermined deflection rate. In addition, as described below, the flay system 100 advantageously provides the ability for recording a time-history of the outward deflection of the workpiece side portions 406 to facilitate a determination that the deflection of the workpiece 400 was performed within predetermined engineering limits, thereby avoiding time-consuming inspection of the skin panel 450 that would otherwise be required if the deflection characteristics (e.g., deflection magnitude, deflection rate and/or deflection movement path) were unknown.

In the example of FIGS. 3-6, the skin panel 450 is generally symmetrical about a workpiece vertical centerline 404 which may dictate operating the flay system 100 in a manner to outwardly deflect the opposing workpiece side portions 406 of the skin panel 450 by equal amounts. However, the presently-disclosed flay system 100 may be implemented on workpieces (not shown) that are non-symmetrical about the workpiece vertical centerline 404. In this regard, the flay system 100 may be operated in a manner to outwardly deflect the workpiece side portion 406 on one side of a workpiece 400 at a different deflection magnitude, rate and/or movement path than the workpiece side portion 406 on an opposite side of the workpiece 400.

Figure 7:
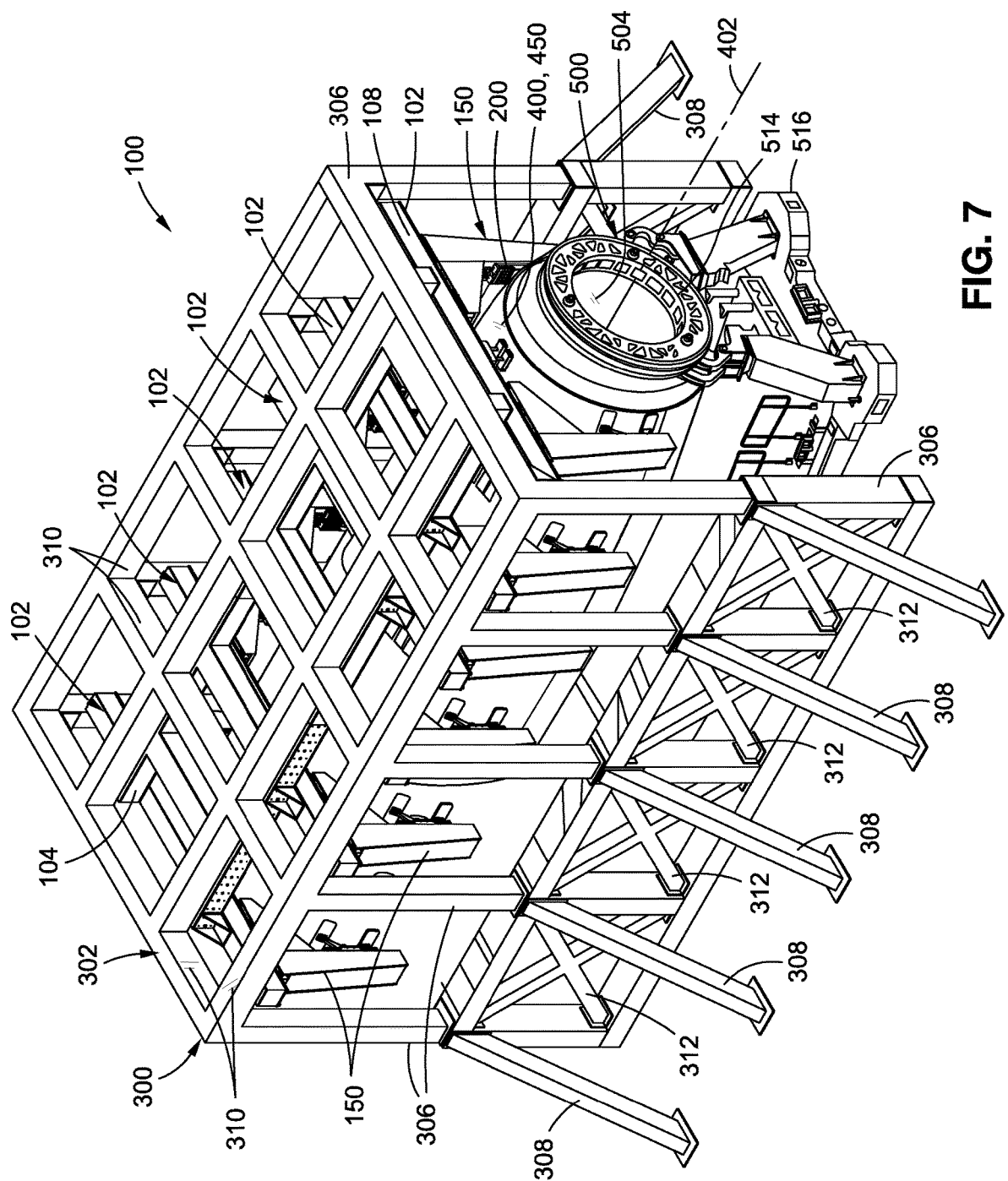
FIG. 7 is a perspective view of an example of a flay system having a plurality of flay assemblies positioned over a layup mandrel for removing the skin panel from the layup mandrel.

FIG. 7 shows an example of a flay system 100 positioned over a layup mandrel 504 for removing the skin panel 450 from the layup mandrel 504. The flay system 100 includes a plurality of flay assemblies 102 (e.g., FIG. 10) arranged in spaced relation to each other. The flay system 100 is shown having a support system 300 configured as a floor stand 302 for supporting the plurality of flay assemblies 102 over the layup mandrel 504. The floor stand 302 is made up of a framework of horizontal support beams 310 and vertical support posts 306. The floor stand 302 may further include a plurality of angled support legs 308 and diagonal braces 312 for laterally supporting the vertical support posts 306. The vertical support posts 306 are interconnected by the horizontal support beams 310. The plurality of flay assemblies 102 may be attached to the horizontal support beams 310 via a backbone frame 104.

Figure 8:
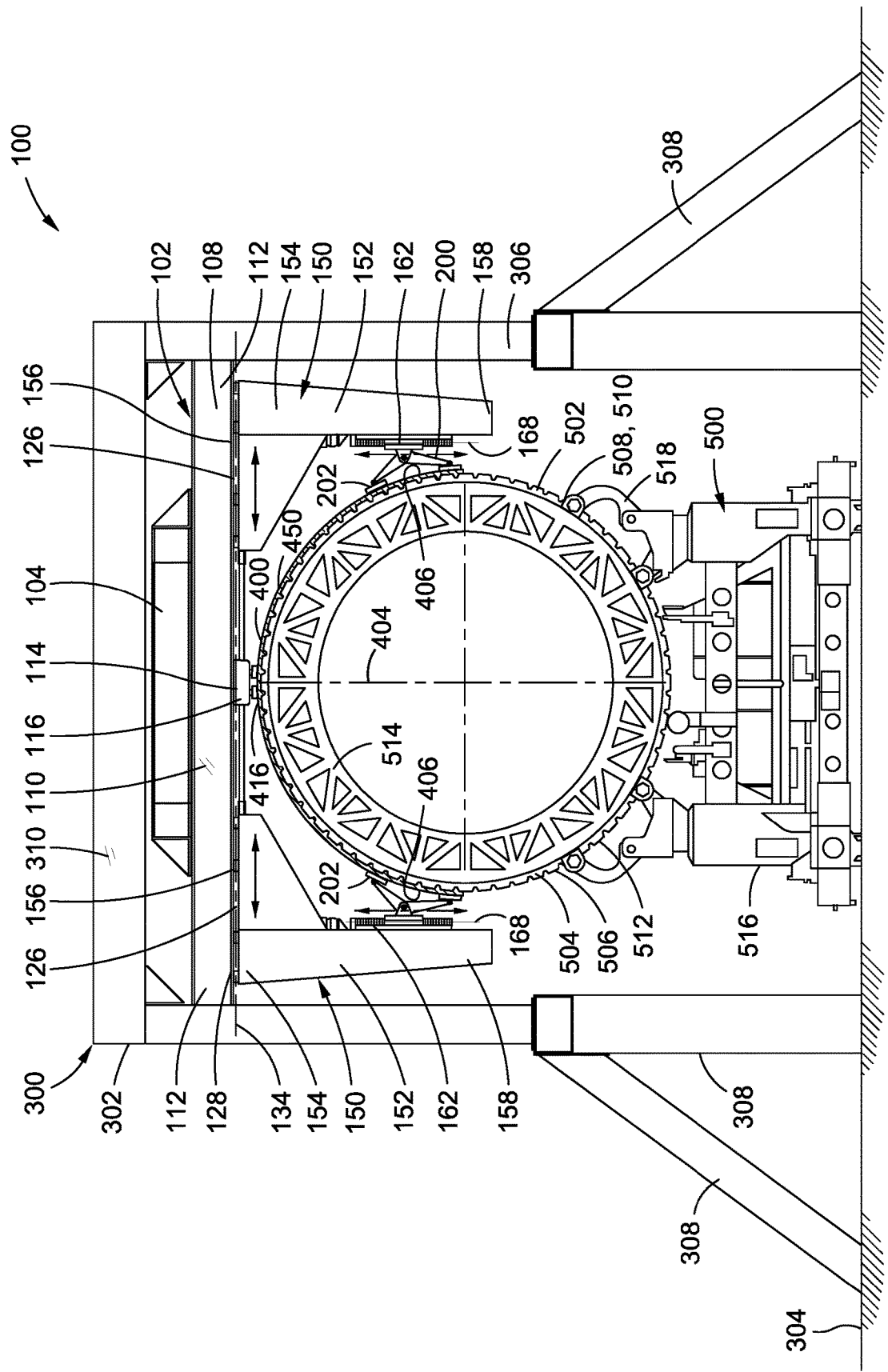
FIG. 8 is a front view of the flay system of FIG. 7 having a floor stand for supporting the flay system over the layup mandrel.

FIG. 8 is a front view of the flay system 100 of FIG. 7 showing the floor stand 302 supporting the flay system 100 over the layup mandrel 504. Also shown is one of the flay assemblies 102 coupled to the skin panel 450 which is supported on the manufacturing fixture 500. As mentioned above, each one of the flay assemblies 102 includes a horizontal beam assembly 108 and a pair of vertical beam assemblies 150 which are mounted in spaced relation to the horizontal beam assembly 108. As described in greater detail below, each one of the vertical beam assemblies 150 is movable along the horizontal beam 110 in coordination with movement of the workpiece attachment assemblies 200 respectively along the pair of vertical beams 152 as a means for outwardly deflecting the workpiece side portions 406 of the skin panel 450.

Figure 9:
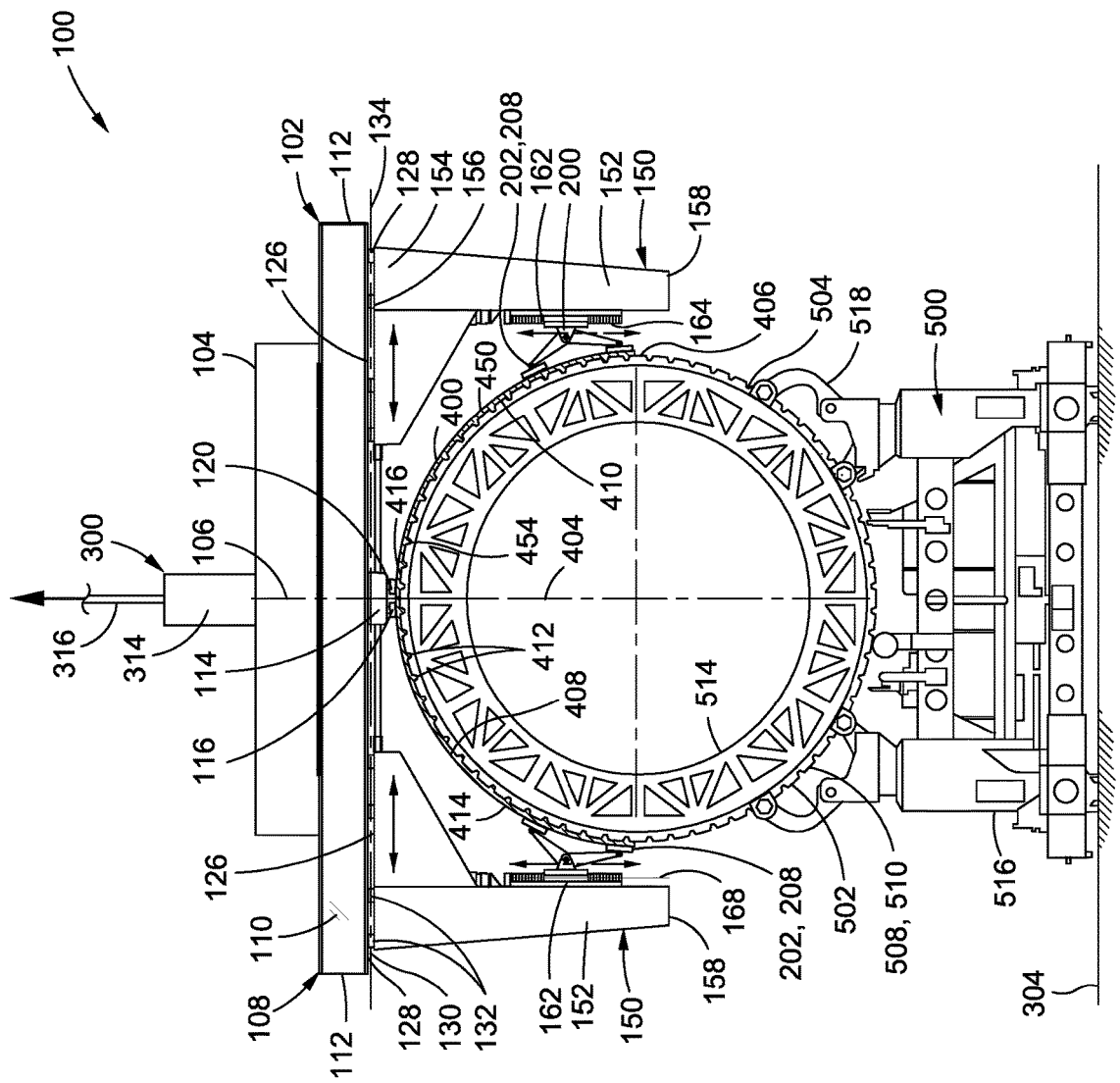
FIG. 9 is a front view of an example of a flay system having a longitudinal beam for suspending the flay system over the layup mandrel.

FIG. 9 is a front view of an example of a flay system 100 supported by a support system 300 configured as a longitudinal beam 314. The longitudinal beam 314 is configured to suspend the flay system 100 from a hoist cable 316. The hoist cable 316 may extend downwardly from an overhead beam (not shown) of a production facility. Alternatively, the longitudinal beam 314 may be suspended from a hoist cable 316 extending downwardly from a mobile crane (not shown). The longitudinal beam 314 may extend along the length of the flay system 100 and may be interconnected to the individual flay assemblies 102 by a backbone frame 104.

FIG. 10 shows an example of a flay system 100 having a plurality of flay assemblies 102 interconnected by a backbone frame 104. The backbone frame 104 may include one or more longitudinally extending beams and one or more laterally extending beams to form a rigid structure that is preferably resistant to twisting and/or deformation during operation of the flay system 100. The quantity of flay assemblies 102 that are included with a flay system 100 may be based on the largest size of a workpiece 400 for which the flay system 100 may be implemented. In this regard, a flay system 100 may be operated such that any number of the flay assemblies 102 may be actively involved in the removal of a workpiece 400 from a manufacturing fixture 500 while one or more of the flay assemblies 102 are inactive. The flay assemblies 102 are preferably spaced apart from each other at a distance that prevents excessive deflection of the portions of the workpiece 400 located between adjacent pairs of flay assemblies 102. In FIG. 10, each flay assembly 102 in the flay system 100 is shown as being identically configured which may simplify manufacturing and assembly of the flay system 100 and may reduce operational complexity. However, in examples not shown, a flay system 100 may have one or more flay assemblies 102 that are configured differently than other flay assemblies 102 in the flay system 100.

Figure 13:
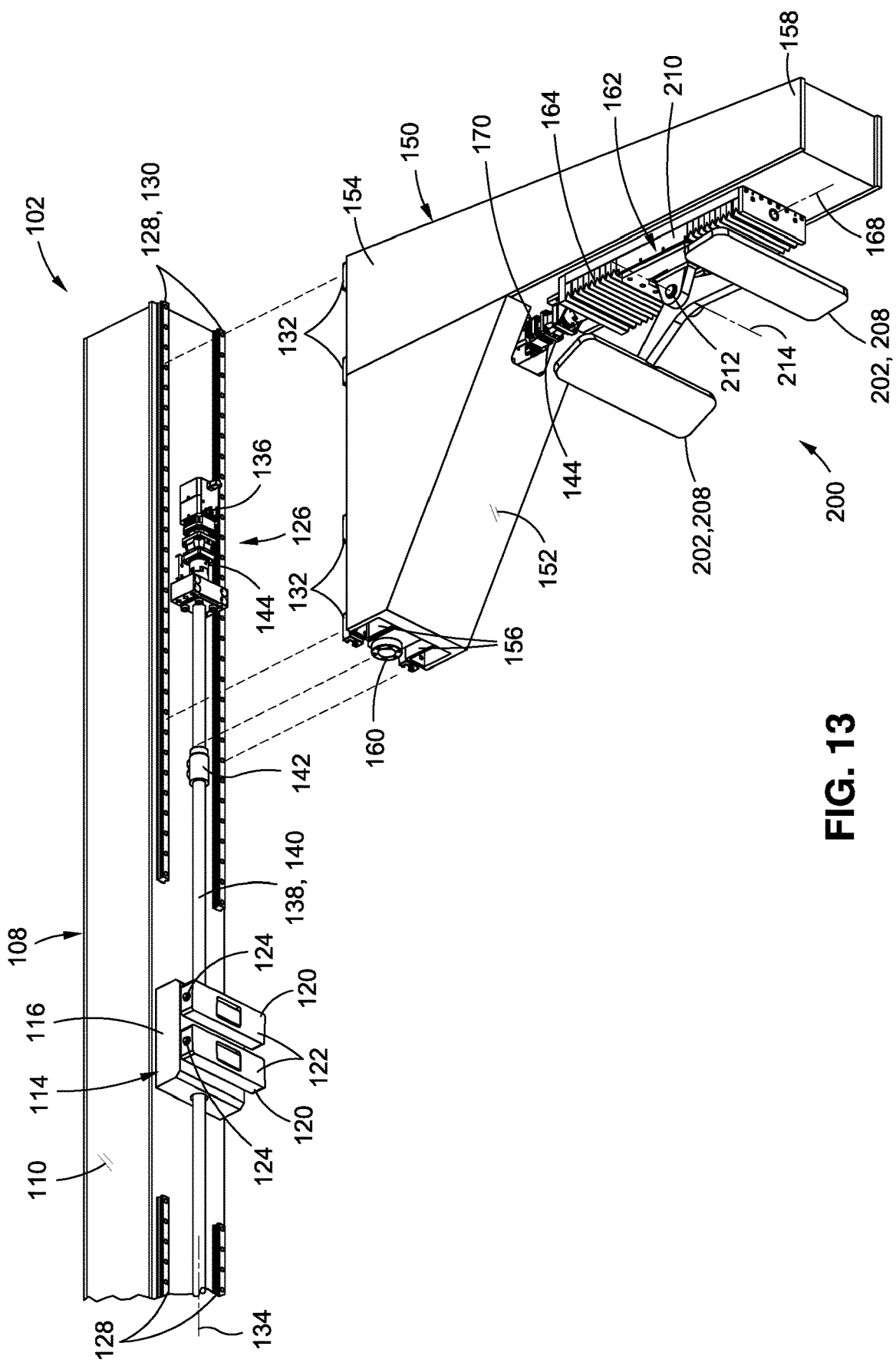
FIG. 13 is an exploded perspective view of a portion of the flay assembly of FIG. 12 and illustrating a horizontal drive mechanism of the horizontal beam assembly having a horizontal drive motor for driving the vertical beam assembly along the horizontal track system.

Referring now to FIGS. 11-13, shown in FIG. 11 is a front view of a portion of a horizontal beam assembly 108 and one of the vertical beam assemblies 150 coupled to the horizontal beam assembly 108. Although the figures of the present disclosure illustrate the vertical beams 152 as being oriented generally perpendicular to the horizontal beam 110 (e.g., FIGS. 8-11), the vertical beams 152 may be oriented at a non-perpendicular angle relative to the horizontal beam 110. It should also be noted that in the present disclosure, the terms "horizontal" and "vertical" are descriptive with regard to the orientation of the flay system 100 components relative to each other for the example flay system 100 shown in the figures, and do not limit the use of the flay system 100 in orientations where the components labelled as horizontal and vertical are respectively non-horizontal and non-vertical. For example, it is contemplated that the flay system 100 may be rotated 90 degrees about a longitudinal axis 402 of a workpiece 400 during removal of the workpiece 400 from a manufacturing fixture 500, and resulting in the horizontal beam 110 being oriented vertically and the vertical beams 152 being oriented horizontally during the workpiece 400 removal process including during outward deflection of the workpiece side portions 406.

Figure 20:
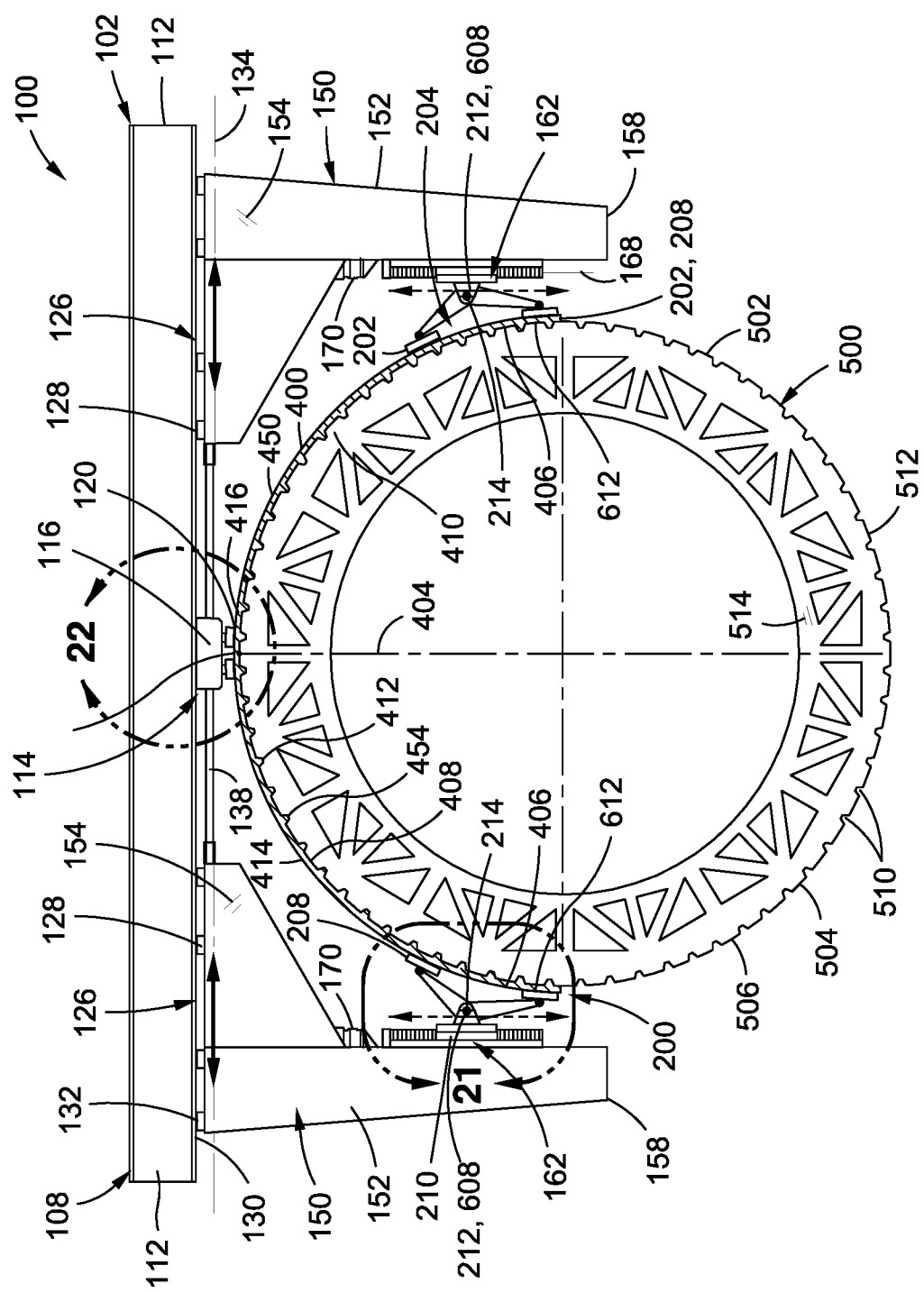
FIG. 20 is a front view of the flay system of FIG. 19 showing the attachment mechanisms of the vertical beam assemblies respectively coupled to the opposing workpiece side portions.

As mentioned above, the horizontal beam 110 has a center support 114 configured to be placed in contact with the workpiece crown 416 as shown in FIGS. 20 and 22. As described in greater detail below, the center support 114 may be coupled to an underside of the horizontal beam 110 and may be centered between the opposing horizontal beam ends 112. In this regard, the center support 114 may be centered on the flay assembly vertical centerline 106. Although shown as being a separate component that is attached (e.g., fastened, welded, bonded) to the underside of the horizontal beam 110, in some examples, the center support 114 may be an integral part of the horizontal beam 110 such as a discrete area (not shown) on the underside or lower surface of the horizontal beam 110. In such an example where the center support 114 is integral to the horizontal beam 110, the horizontal drive mechanism 126 including the horizontal drive motor 136 and horizontal drive shaft 138 may be located in an interior (not shown) of the horizontal beam 110 or on a side of the horizontal beam 110 to avoid interfering with the workpiece 400 during contact of the center support 114 to the workpiece crown 416.

As shown in FIG. 13, the horizontal beam assembly 108 includes at least one horizontal drive mechanism 126 configured to move the vertical beam assemblies 150 along the horizontal drive axis 134. In the presently-disclosed flay system 100, each horizontal beam assembly 108 includes a pair of horizontal drive mechanisms 126 respectively located on opposite sides of the flay assembly vertical centerline 106. The horizontal beam assembly 108 further includes at least one horizontal beam track system 128. In the example shown, a horizontal beam track system 128 may be mounted to the horizontal beam 110 on each of opposing sides of the flay assembly vertical centerline 106. Each one of the horizontal beam track systems 128 may include at least one set of guide tracks 130 mounted to the horizontal beam 110. For example, a pair of guide tracks 130 may be mounted to the horizontal beam 110 on each side of the flay assembly vertical centerline 106. As shown in FIG. 12, the guide tracks 130 may be fixedly coupled to the underside of the horizontal beam 110 and may extend along a lengthwise direction of the horizontal beam 110 as shown in FIGS. 11 and 13. The horizontal beam track system 128 defines the horizontal drive axis 134 which extends along the lengthwise direction of the horizontal beam 110 between opposing horizontal beam ends 112.

As shown in FIGS. 11-13, each one of the vertical beams 152 has a vertical beam top portion 154 and a vertical beam bottom portion 158. Each vertical beam top portion 154 is coupled to the horizontal beam track system 128 by one or more pairs of top portion brackets 156 of the vertical beam top portion 154. For example, each top portion bracket 156 may include a linear bearing 132 configured to be slidably coupled to one of the guide tracks 130 of the horizontal beam track system 128. The vertical beam assemblies 150 are driven along the horizontal drive axis 134 by one or more horizontal drive motors 136. Each horizontal drive motor 136 may include a horizontal drive shaft 138 rotatably driven by the horizontal drive motor 136. The horizontal drive shaft 138 may be configured as a threaded shaft 140 such as a lead screw or a ball screw. The vertical beam top portion 154 of each one of the vertical beams 152 may be operably engaged to the horizontal drive shaft 138 for driving the vertical beams 152 assembly along the horizontal drive axis 134. For example, each vertical beam top portion 154 may have a drive fitting 160 (e.g., FIG. 13) coupled to a nut 142 (e.g., FIG. 13) that is threadably engaged to the threaded shaft 140.

The horizontal drive motor 136 may be provided as a servo motor for rotating the threaded shaft 140 for driving the vertical beam assembly 150 linearly along the horizontal drive axis 134. In one example, the horizontal drive motor 136 may be provided as a brushless direct current (DC) servo motor coupled to the threaded shaft 140 via a gearbox (not shown) such as a planetary gearbox. In addition, a rotary encoder 144 such as a 12-bit rotary encoder may be operably coupled to the horizontal drive motor 136 for measuring angular motion of the threaded shaft 140. In some examples, each horizontal beam assembly 108 may include a single horizontal drive motor 136 configured to rotate a single threaded shaft 140 to which both of the vertical beam assemblies 150 are operably engaged. In such an arrangement, the portion of the threaded shaft 140 on one side of the flay assembly vertical centerline 106 may have left-hand threads (not shown) to which a nut 142 is threadably engaged, and the portion of the threaded shaft 140 on the opposite side of the flay assembly vertical centerline 106 may have right-hand threads (not shown) to which a nut 142 is threadably engaged, and resulting in the vertical beam assemblies 150 moving in opposite directions during rotation of the threaded shaft 140 by a single one of the horizontal drive motors 136. In other examples, each horizontal beam assembly 108 may include a pair of horizontal drive motors 136 respectively located on opposite sides of the flay assembly vertical centerline 106 and each configured to independently rotate a threaded shaft 140 respectively coupled to the horizontal drive motors 136. In such an arrangement, the vertical drive motors 170 may be operated in a synchronized manner for equal and opposite motion of the respective vertical beam assemblies 150 along the horizontal drive axis 134.

Referring to FIG. 14-18, shown is an example of a vertical beam assembly 150. As mentioned above, each vertical beam assembly 150 includes a vertical drive mechanism 162 mounted to the vertical beam 152. The vertical drive mechanism 162 includes a vertical beam track system 166 defining a vertical drive axis 168. The vertical beam track system 166 of each one of vertical drive mechanisms 162 may include a pair of guide tracks 130 fixedly coupled to the vertical beam 152 and extending along a lengthwise direction of the vertical beam 152. The vertical beam track system 166 defines the vertical drive axis 168 which is oriented parallel to the lengthwise direction of the vertical beam 152. The workpiece attachment assembly 200 is coupled to the vertical beam track system 166. For example, as shown in FIG. 15-16, the workpiece attachment assembly 200 may include an attachment block 210 that may be coupled to the pair of guide tracks 130 via linear bearings 132.

In FIGS. 14-18, each vertical drive mechanism 162 includes a vertical drive motor 170 coupled to a vertical drive shaft 172 rotatably driven by the vertical drive motor 170. The vertical drive mechanism 162 may be configured similar to the above-described horizontal drive mechanism 126. For example, the vertical drive shaft 172 may be a threaded shaft 140 having a nut 142 engaged to the threaded shaft 140. The vertical drive motor 170 may be provided as an electric motor such as a brushless DC servo motor. Each vertical assembly includes a workpiece attachment assembly 200 that is operably engaged to the vertical drive shaft 172 for driving the workpiece attachment assembly 200 along the vertical drive axis 168. For example, the attachment block 210 may include a drive fitting 160 fixedly coupled to a nut 142 that is threadably engaged to the threaded shaft 140 of the vertical drive mechanism 162. Rotation of the threaded shaft 140 by the vertical drive motor 170 causes corresponding linear motion of the workpiece attachment assembly 200 along the vertical drive axis 168. The vertical drive mechanism 162 may include a pair of linearly expandable bellows 164 located on upper and lower sides of the attachment block 210 for protection of the linear bearings 132, guide tracks 130, threaded shaft 140, nut 142, and drive fitting 160 from dust, dirt, and other contaminants.

Although the horizontal drive mechanism 126 and vertical drive mechanism 162 are each described as having a nut 142 threadably engaged to a threaded shaft 140 for converting rotary motion of the horizontal drive motor 136 and vertical drive motor 170 into linear motion respectively of the vertical beam assemblies 150 and workpiece attachment assemblies 200, the horizontal drive mechanism 126 and/or the vertical drive mechanism 162 may alternatively be configured as a rack-and-pinion drive system (not shown), a belt drive system (not shown), or any one a variety of other drive systems capable of driving the vertical beam assemblies 150 and workpiece attachment assemblies 200 respectively along the horizontal drive axis 134 and vertical drive axes 168. In this regard, the horizontal drive mechanisms 126 and the vertical drive mechanisms 162 are not limited to the embodiments shown and described.

In FIG. 14-18, the workpiece attachment assembly 200 includes the attachment mechanism 202 which is configured to be removably attached to one of opposing workpiece side portions 406 (e.g., FIG. 20) of a workpiece 400 supported on a manufacturing fixture 500 underlying the workpiece 400. As described above, the workpiece 400 may have a workpiece inner surface 408 having an inner surface geometry 410 that may be supported on the fixture outer surface 502 of the manufacturing fixture 500. As mentioned above, the inner surface geometry 410 of the workpiece 400 may prevent removal of the workpiece 400 from the manufacturing fixture 500. For example, as described above, the stringers 454 (e.g., protrusions 412) of a skin panel 450 may be nested within the grooves 510 (e.g., depressions 508) of a layup mandrel 504 and which may prevent removal of the skin panel 450 from the layup mandrel 504.

Referring still to FIG. 14-18, the attachment mechanism 202 may include one or more vacuum plates 208 each having one or more vacuum cups (not shown). For example, each vacuum plate 208 may include an array of vacuum cups (not shown) fluidly coupled to a vacuum source (not shown). The vacuum source may comprise a vacuum pump which may be mounted on the flay system 100. When the vacuum plates 208 are positioned against the workpiece outer surface 414 of a workpiece side portion 406, activation of the vacuum source may cause vacuum attachment of the vacuum plate 208 to the workpiece outer surface 414. In some examples, the array of vacuum cups of each vacuum plate 208 may be multi-chambered in which sets of one or more vacuum cups of each vacuum plate 208 are independently fluidly coupled to the vacuum source for redundancy in the event of a loss of vacuum pressure at one or more of the vacuum cups. Each vacuum plate 208 may have a length-to-width aspect ratio of greater than 1. The length of the vacuum plate 208 may be oriented generally parallel to a lengthwise direction (e.g., axial direction) of the workpiece 400. However, the vacuum plate 208 may have a length-to-width aspect ratio equal to or less than 1.

Figure 18:
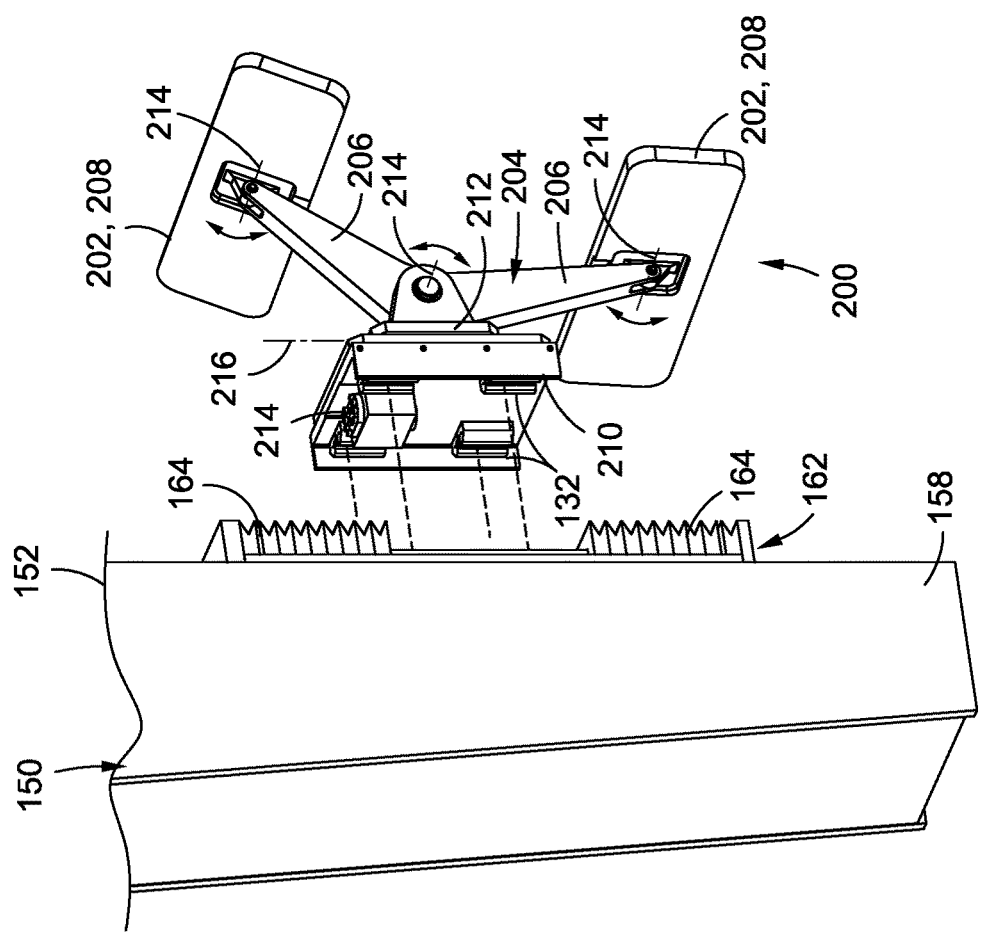
FIG. 18 is a partially exploded perspective view of the vertical beam assembly showing a plurality of linear bearings for slidably coupling the workpiece attachment assembly to the vertical beam track system.
Figure 17:
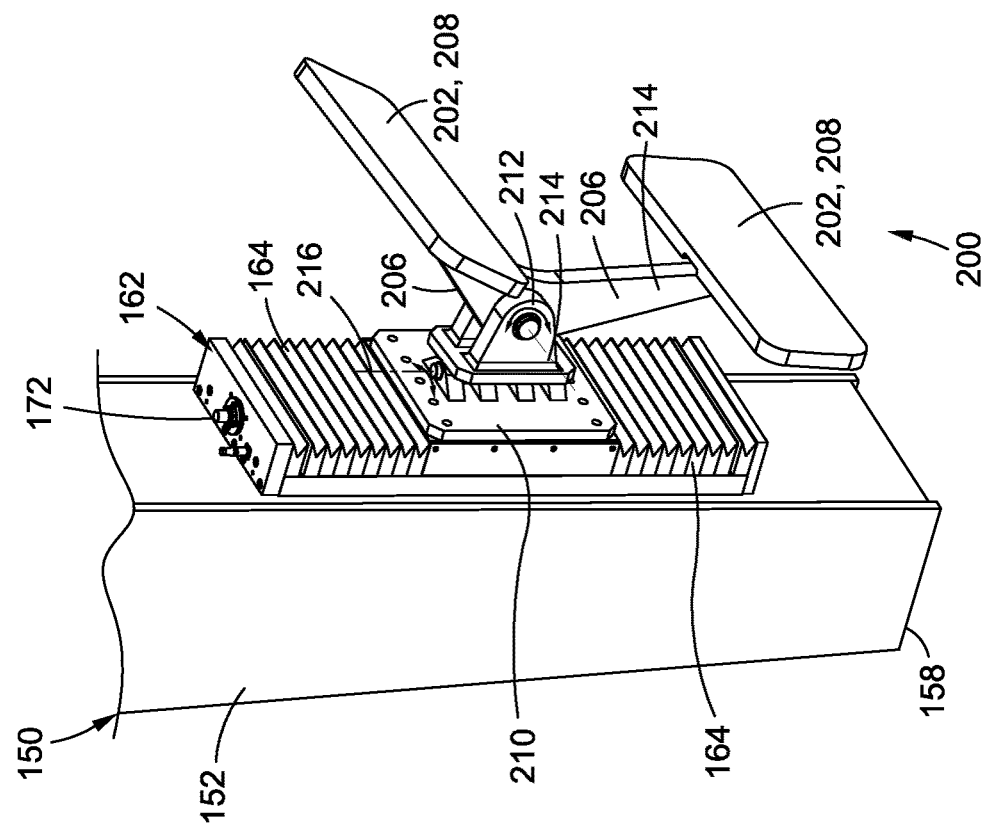
FIG. 17 is a perspective view of a lower portion of a vertical beam assembly showing a workpiece attachment assembly including an attachment mechanism configured to be removably coupled to a workpiece side portion of a workpiece.

Referring to FIG. 17-18, in the example shown, the workpiece attachment assembly 200 of each vertical beam assembly 150 may include an attachment assembly pivot joint 212 pivotably coupling the attachment mechanism 202 to the vertical drive mechanism 162. The attachment assembly pivot joint 212 may be provided as a pseudo-spherical joint configured to limit movement of the attachment mechanism 202 to pivoting about a roll axis 214 and optionally about a yaw axis 216. The roll axis 214 may be oriented orthogonal to the vertical drive axis 168 and orthogonal to the horizontal drive axis 134. The yaw axis 216 may be oriented approximately parallel to the vertical drive axis 168. The attachment mechanisms 202 may pivot about the roll axis 214 and/or the yaw axis 216 of the attachment assembly pivot joint 212 to facilitate attachment of the attachment mechanism 202 to the workpiece side portions 406 and/or to allow free movement of the attachment mechanisms 202 relative to the vertical drive mechanism 162 during outward deflection of the workpiece side portions 406. Configuring the attachment assembly pivot joints 212 for pivoting motion about the roll axis 214 and yaw axis 216 allows the attachment mechanisms 202 to self-orient in a manner such that the attachment mechanisms 202 are locally tangent to the workpiece outer surface 414 during engagement of the attachment mechanism 202 to the workpiece side portion 406. In addition, free pivoting of the attachment mechanisms 202 about the roll axis 214 and yaw axis 216 reduces or prevents torque loads in the workpiece attachment assembly 200 and/or in the workpiece 400 that would otherwise be generated during deflection of the workpiece side portions 406 if the attachment mechanisms 202 were prevented from pivoting about the role axis and yaw axis 216 such as during outward deflection of the workpiece side portions 406.

To further facilitate engagement of the attachment mechanisms 202 to the workpiece side portions 406, the attachment assembly pivot joint 212 may be configured to prevent pivoting of the attachment mechanisms 202 about a pitch axis (not shown) at least during the initial engagement of the attachment mechanisms 202 to the workpiece side portions 406. Although not shown, the pitch axis may be oriented orthogonal to both the roll axis 214 and the yaw axis 216. Preventing pivoting of the attachment mechanisms 202 about a pitch axis may maintain the attachment mechanisms 202 in alignment with the lengthwise direction of the workpiece 400. For example, in the example where the attachment mechanisms 202 are configured as vacuum plates 208, preventing pivoting of the vacuum plates 208 about the pitch axis prevents the vacuum plates 208 from contacting the workpiece outer surface 414 in a skewed orientation non-parallel to the longitudinal axis 402 of the workpiece 400 (e.g., a skin panel 450 that is semi-cylindrical), and which may prevent one or more of the vacuum cups of the vacuum plate 208 from forming a vacuum-tight seal against the workpiece outer surface 414 of the skin panel 450.

Figure 27:
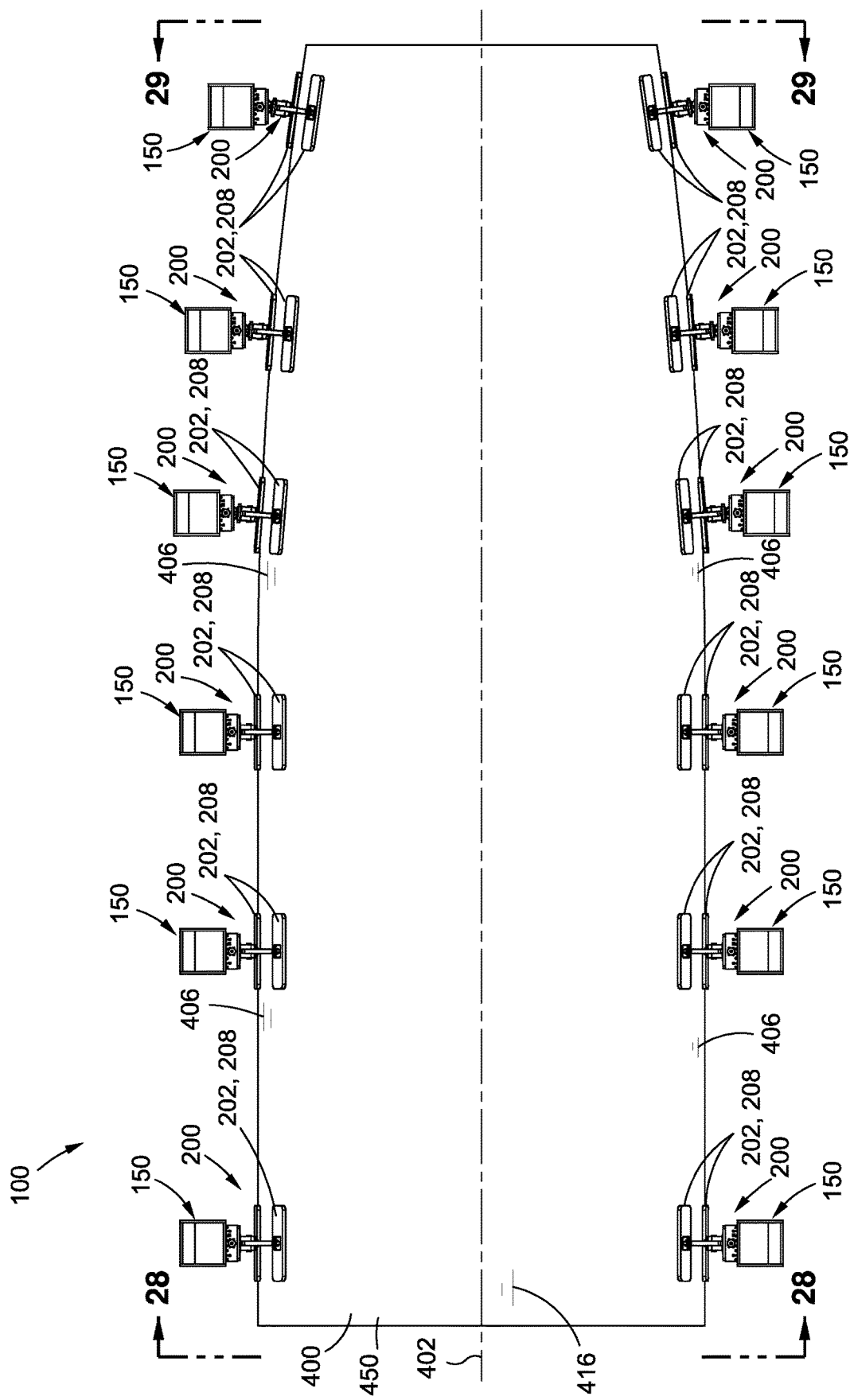
FIG. 27 is a top view of the flay system of FIG. 26 showing the vertical beam assemblies positioned to accommodate variations in the radius of curvature of the workpiece along a longitudinal axis of the workpiece.
Figure 28:
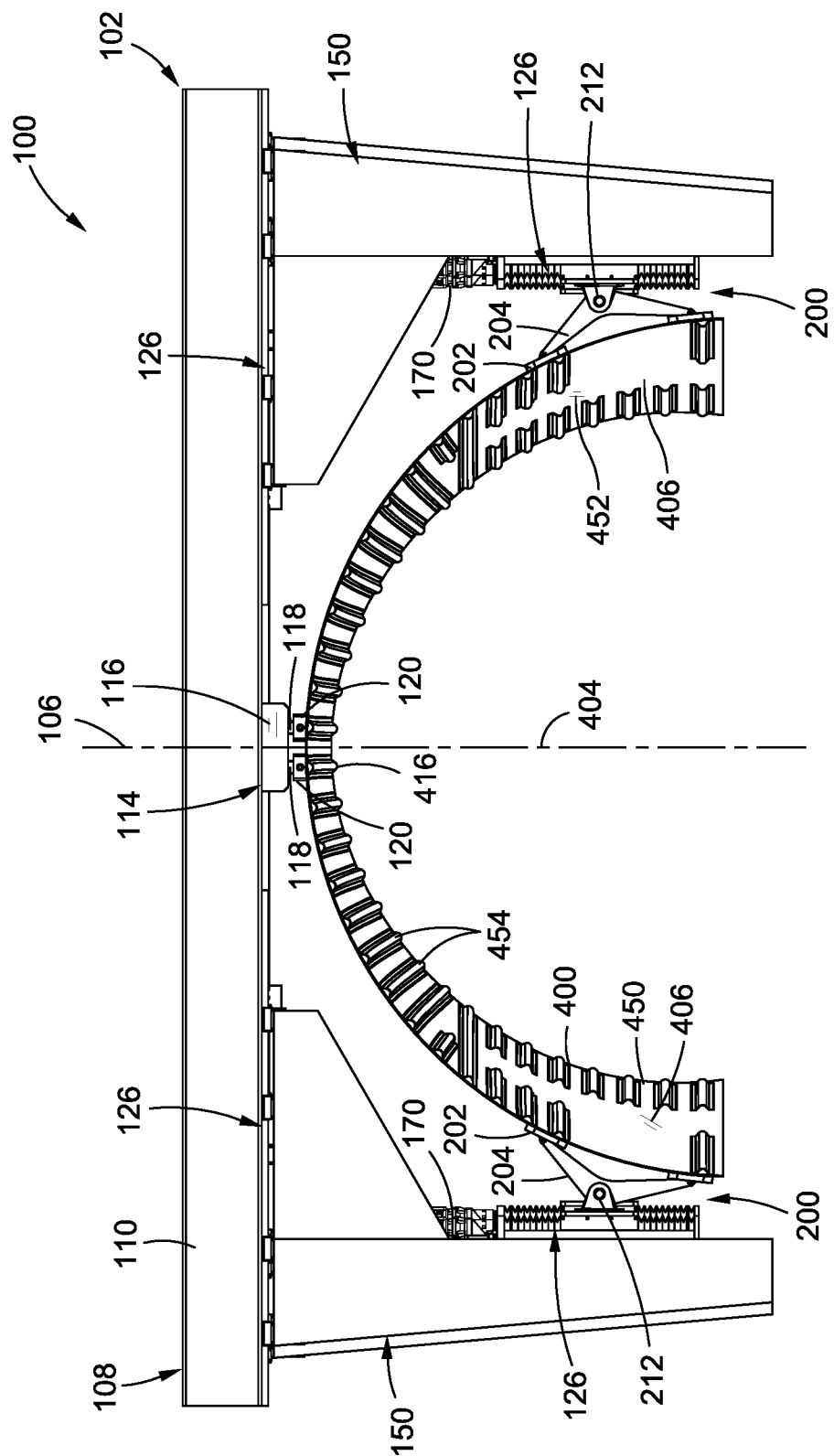
FIG. 28 is an end view of the flay system taken along line 28 of FIG. 27.

The flay system 100 may be configured such that the attachment mechanisms 202 of some of the flay assemblies 102 are limited to pivoting about a roll axis 214, and other flay assemblies 102 of the same flay system 100 allow for pivoting about both the roll axis 214 and the yaw axis 216. For example, in FIG. 27, the three (3) flay assemblies 102 located on the left-hand side of FIG. 27 that interface with the constant cylindrical cross-section portion of the skin panel 450 may require pivoting of the attachment assemblies about only the roll axis 214 to allow the attachment mechanisms 202 (e.g., vacuum plates 208) to self-align with the cylindrical shape of the skin panel 450. However, the three (3) flay assemblies 102 located on the right-hand side of FIG. 27 that interface with the variable cross-section/compound curvature portion of the skin panel 450 may require pivoting about both the roll axis 214 and the yaw axis 216 to allow the attachment mechanisms 202 to self-align into a tangent orientation with the compound curvature of the skin panel 450.

Referring to the example shown in FIGS. 17-18, each attachment mechanism 202 may include a pair of the vacuum plates 208 respectively coupled to a pair of pivot arms 206 of a pivot bracket 204 pivotably coupled by an attachment assembly pivot joint 212 to the vertical drive mechanism 162. Each one of the vacuum plates 208 may be mounted to a free end of a pivot arm 206 in a manner limiting movement of the vacuum plate 208 to pivoting motion about the roll axis 214 of the pivot arm 206. As may be appreciated, the attachment assembly pivot joint 212 and/or the pivot joints at the free end of each pivot arm 206 may facilitate engagement of the vacuum cups of the vacuum plates 208 to the workpiece outer surface 414.

It should be noted that the attachment mechanism 202 is not limited to vacuum plates 208 and may include any one a variety of other types of attachment mechanisms 202 capable of coupling the workpiece attachment assembly 200 to the workpiece side portions 406. For example, although not shown, an attachment mechanism 202 may be configured as a mechanical attachment device (not shown) for mechanically coupling to a workpiece side portion 406. In an embodiment, an attachment mechanism 202 may include one or more threaded fasteners configured to be threadably engaged (e.g., manually or via a remotely-controlled screw drive mechanism) to a threaded receptacle (e.g., an internally-threaded insert, a nutplate, etc.) that may be pre-installed on the workpiece 400.

Figure 19:
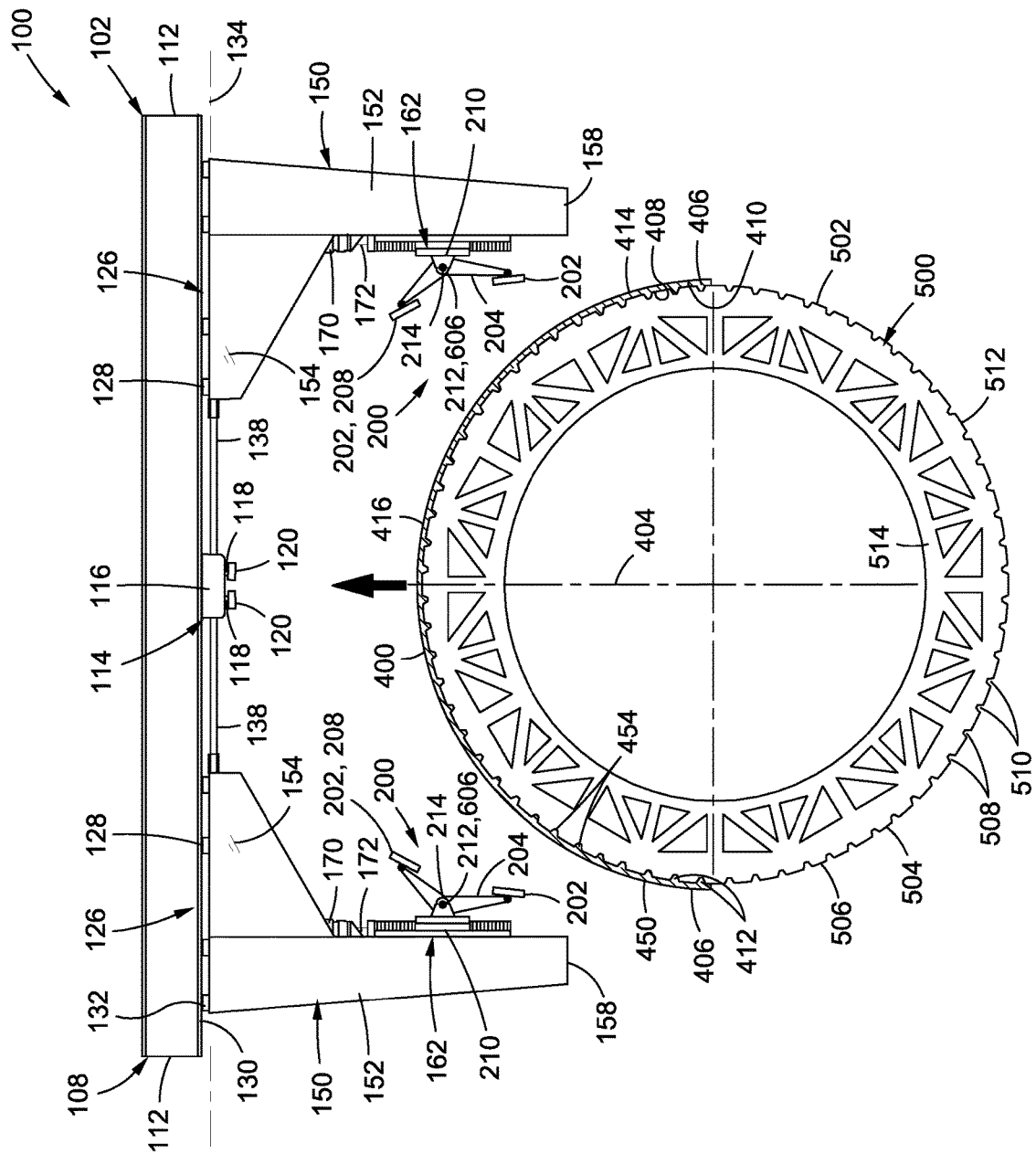
FIG. 19 is a front view of an example of a flay system supported above a manufacturing fixture and showing the attachment mechanisms in a pre-attachment position in preparation for coupling to the opposing workpiece side portions of a workpiece supported on the manufacturing fixture.

Referring to FIG. 19, shown is an example of the flay system 100 positioned above a manufacturing fixture 500 configured as a layup mandrel 504 supporting a workpiece 400 configured as a skin panel 450. In the example shown, the manufacturing fixture 500 is shown being vertically raised into position for engagement with the flay system 100. Alternatively or additionally, the flay system 100 may be lowered into engagement with the manufacturing fixture 500. Prior to engagement of the flay system 100 to the workpiece 400, the horizontal drive motor 136 and vertical drive motors 170 may be operated in a manner to locate each one of the attachment mechanisms 202 at a pre-attachment position 606 in preparation for coupling the attachment mechanisms 202 respectively to the workpiece side portions 406. In this regard, the horizontal drive motors 136 may be operated in a manner to horizontally space the vertical beam assemblies 150 apart from each other at a distance that provides clearance between each attachment mechanism 202 and the corresponding one of the workpiece side portions 406. In addition, the vertical drive motors 170 may be operated in a manner to vertically position each one of the workpiece attachment assemblies 200 at a vertical location where the attachment mechanisms 202 will be coupled to the workpiece side portions 406 when the center support 114 is in contact with the workpiece crown 416.

Referring to FIG. 20, shown is the flay system 100 engaged to the workpiece 400 which is supported in an undeflected state 612 on the manufacturing fixture 500. Prior to engagement of the flay system 100 with the workpiece 400 in FIG. 20, the horizontal drive motors 136 may have been activated to move the vertical beam assemblies 150 toward each other for moving the pair of attachment mechanisms 202 (e.g., vacuum plates 208) from the pre-attachment position 606 (FIG. 19) to an initial position 608 (FIG. 20) at which the attachment mechanisms 202 are engaged to or are in contact with the workpiece side portions 406. For examples of the flay system 100 in which the attachment mechanisms 202 are configured as vacuum plates 208, the vacuum source (not shown) may be activated to cause vacuum sealing of the vacuum cups (not shown) of the vacuum plates 208 to the workpiece outer surface 414 at the workpiece side portions 406.

FIG. 21 is a magnified view of a portion of the vertical beam assembly 150 showing one of the attachment mechanisms 202 configured as a pair of vacuum plates 208 attached to one of the workpiece side portions 406. As described above, during mating of the vacuum plates 208 to the workpiece outer surface 414, the vacuum plates 208 may self-orient into alignment with the workpiece outer surface 414 by pivoting capability of each vacuum plate 208 respectively at least about the roll axis 214 at the free end of each pivot arm 206. In addition, self-orientation of the vacuum plates 208 into alignment with the workpiece outer surface 414 may be facilitated by the attachment assembly pivot joint 212 which allows pivoting of the attachment mechanism 202 about the roll axis 214 and also optionally about the yaw axis 216 of the attachment assembly pivot joint 212.

FIG. 22 is a magnified view of a portion of the horizontal beam assembly 108 showing the center support 114 of the horizontal beam 110 in contact with the workpiece outer surface 414. The center support 114 may be centered between the pair of vertical beam assemblies 150 and functions as a center of rotation 604 about which the attachment mechanisms 202 are moved during outward deflection of the workpiece side portions 406, as described in greater detail below. As mentioned above, the center support 114 may be located at a flay assembly vertical centerline 106 which may be located at a mid-point between the pair of vertical beam assemblies 150. The center support 114 may have at least one support pad 120 extending outwardly from the horizontal beam 110 and configured to be locally tangent to the workpiece outer surface 414 at the workpiece crown 416. In the example shown, the center support 114 includes a pair of support pads 120 which may each be configured to be locally tangent to the workpiece outer surface 414 at the workpiece crown 416 when the workpiece attachment assemblies 200 are attached respectively to the opposing workpiece side portions 406. In one example, each one of the support pads 120 may be pivotable about a pad pivot axis 124 to allow for self-orientation of the pivot pads into tangent relation to the workpiece outer surface 414 as the support pad 120 is moved into contact with the workpiece crown 416. The support pads 120 may maintain the workpiece inner surface 408 in contact with the fixture outer surface 502 at the workpiece crown 416 during outward deflection of the opposing workpiece side portions 406. In an embodiment not shown, the support pads 120 may include one or more vacuum cups to allow the support pads 120 to be releasably attached to the workpiece crown 416 to assist the vacuum plates 208 on the opposing workpiece side portions 406 in supporting the mass of the workpiece 400 such as during separation and/or translation of the manufacturing fixture 500 away from the workpiece 400 as shown in FIG. 25 and described in greater detail below.

Figure 29:
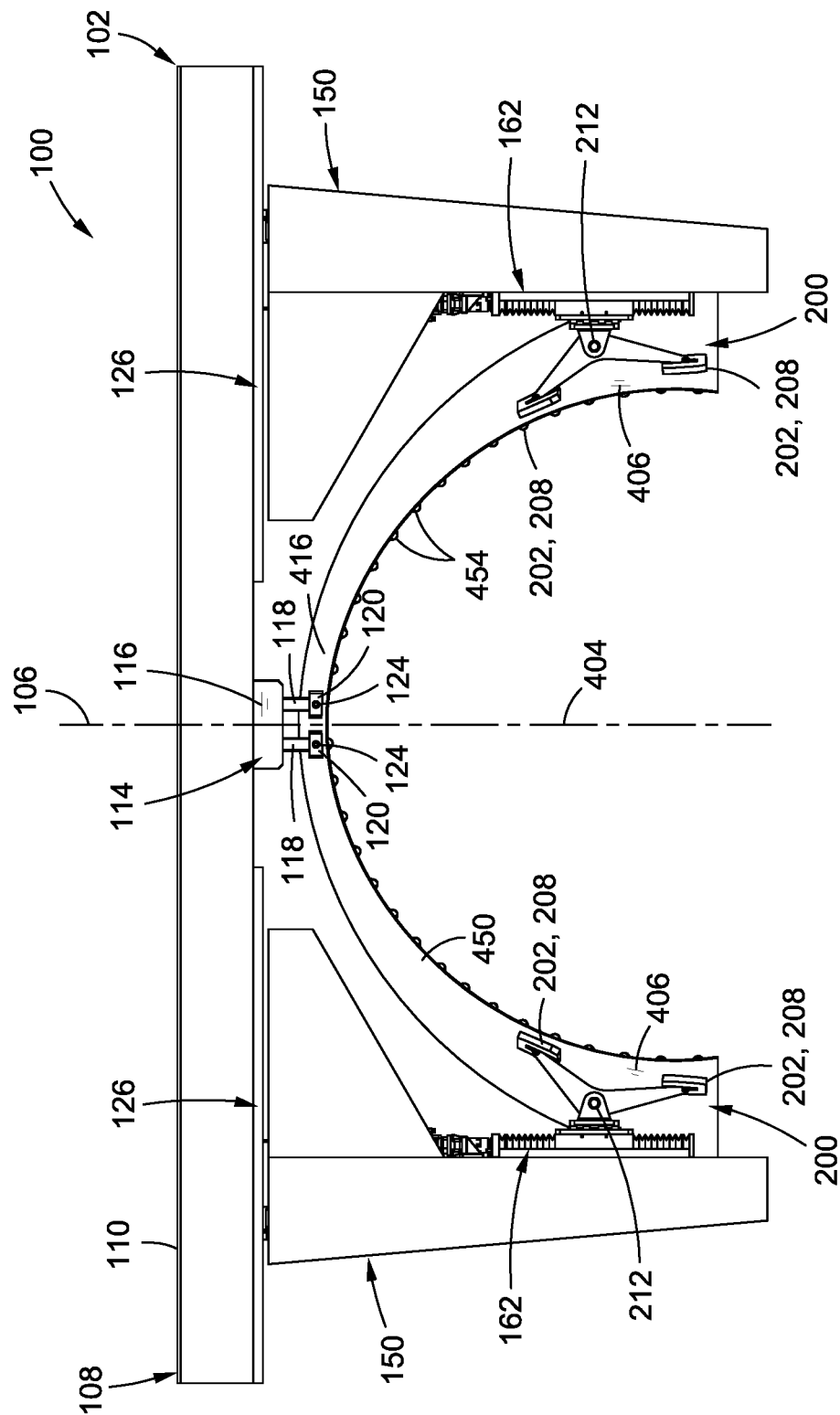
FIG. 29 is an end view of the flay system taken along line 29 of FIG. 27.

In some examples, the center support 114 may include a center support block 116 mounted to the horizontal beam 110. The horizontal drive shaft 138 may optionally extend through the center support block 116. The center support block 116 may include a pair of center support shafts 118 extending vertically downwardly from the center support block 116. A pair of the support pads 120 may be arranged in side-by-side relation and mounted respectively to the free ends of the pair of center support shafts 118. The center support shafts 118 may be vertically adjustable to allow for adjusting the vertical position of the support pads 120 for positioning into contact with the workpiece outer surface 414 for a workpiece 400 in which the distance from the workpiece crown 416 to the horizontal beam 110 varies along the longitudinal axis 402 of the workpiece 400. For example, the skin panel 450 shown in FIGS. 26-27 has a semi-cylindrical shape that tapers in diameter along the longitudinal axis 402 (e.g., axial centerline) of the skin panel 450. The taper in the diameter of the skin panel 450 results in variations in the distance between the workpiece crown 416 and the horizontal beam 110 of a flay assembly 102 at one end of the flay system 100 (FIG. 20) relative to the distance between the workpiece crown 416 and the horizontal beam 110 of a flay assembly 102 at an opposite end of the flay system 100 (FIG. 29). By adjusting the center support shafts 118, the vertical position of the support pads 120 may be adjusted such that the support pads 120 of each flay assembly 102 contact the workpiece crown 416.

Referring still to FIG. 22, each support pad 120 may have a pad surface 122 configured to be tangent to the workpiece outer surface 414 proximate the workpiece crown 416 (e.g., at the workpiece vertical centerline 404). As mentioned above, each one of the support pads 120 may be pivotably coupled (via a pad pivot axis 124) to the end of the center support shaft 118 to allow the pad surface 122 to self-orient until locally tangent to the workpiece outer surface 414 at the workpiece crown 416 during initial engagement of the support pads 120 with the workpiece outer surface 414 as the manufacturing fixture 500 is vertically moved into engagement with the flay system 100 (e.g., FIG. 19). As mentioned above, each one of the support pads 120 of the center support 114 maintains the workpiece inner surface 408 in contact with the fixture outer surface 502 at the workpiece crown 416 during outward deflection of the workpiece side portions 406, which may otherwise have a tendency to vertically lift off the workpiece 400 during outward deflection of the workpiece side portions 406.

Figure 23:
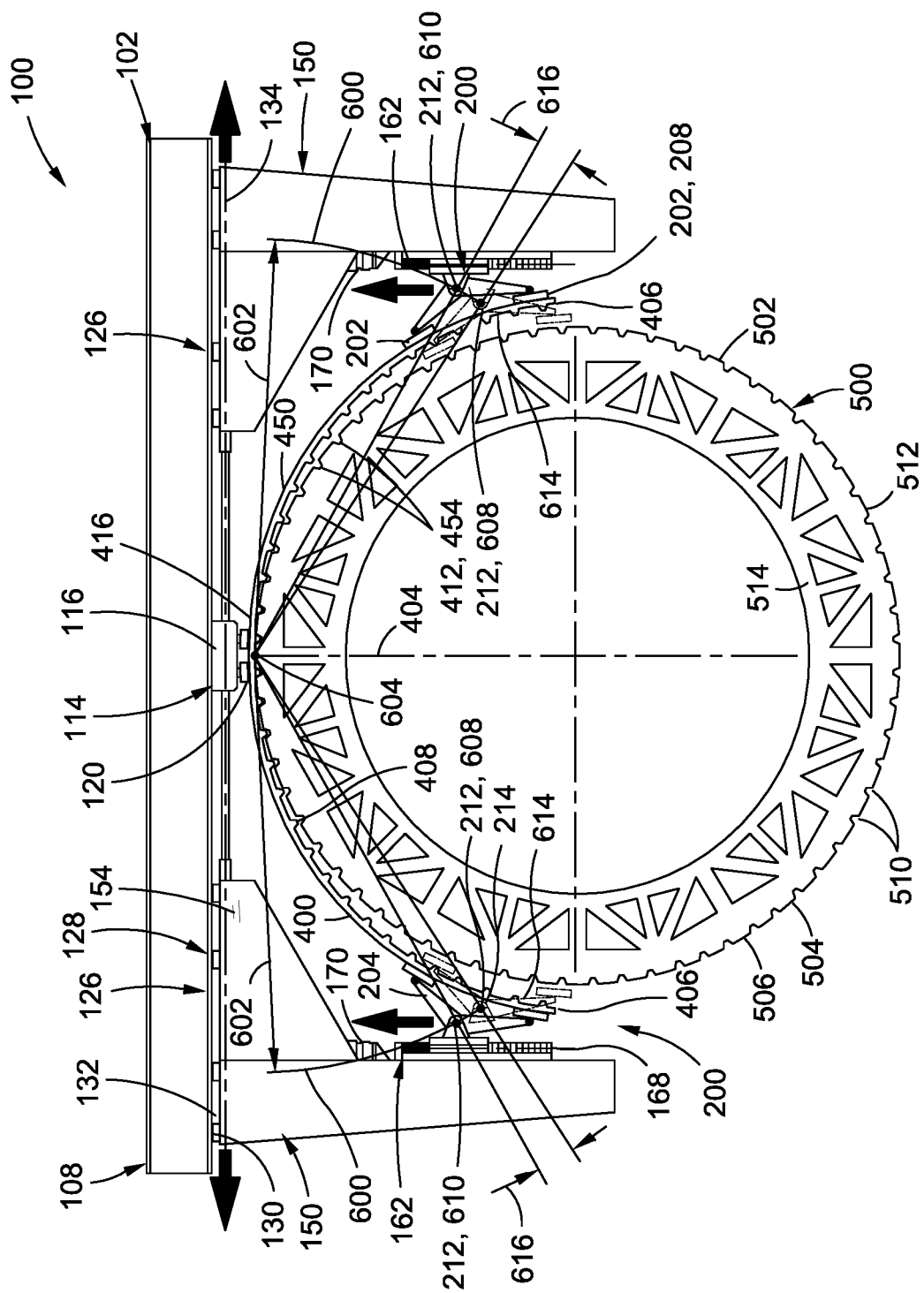
FIG. 23 is a front view of the flay assembly of FIG. 20 showing the workpiece side portions being outwardly deflected by the attachment mechanisms.
Figure 24:
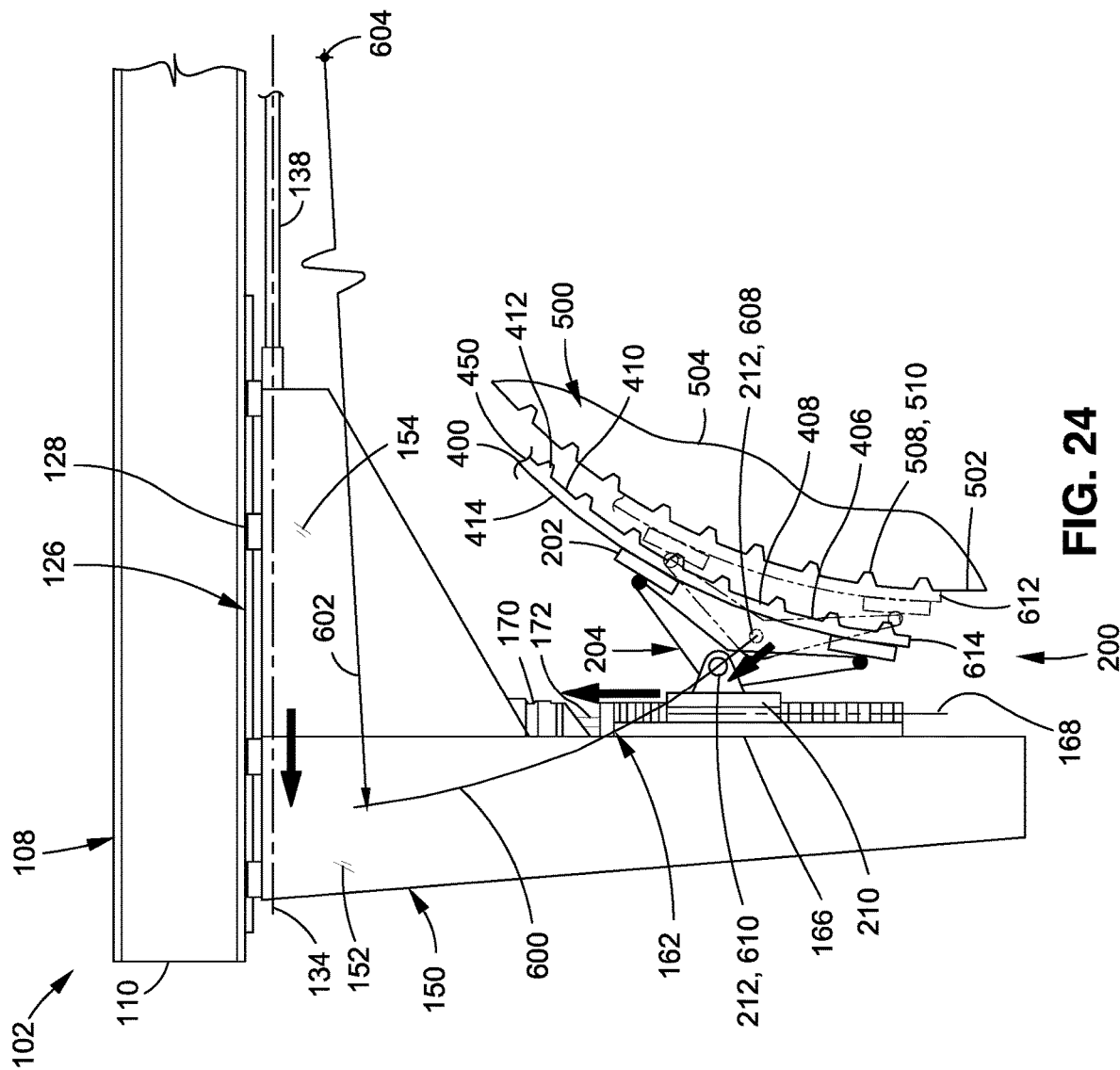
FIG. 24 is a magnified view of a portion of the flay assembly of FIG. 23 showing movement of an attachment mechanism along a deflection arc centered at a center of rotation at the workpiece crown.
Figure 25:
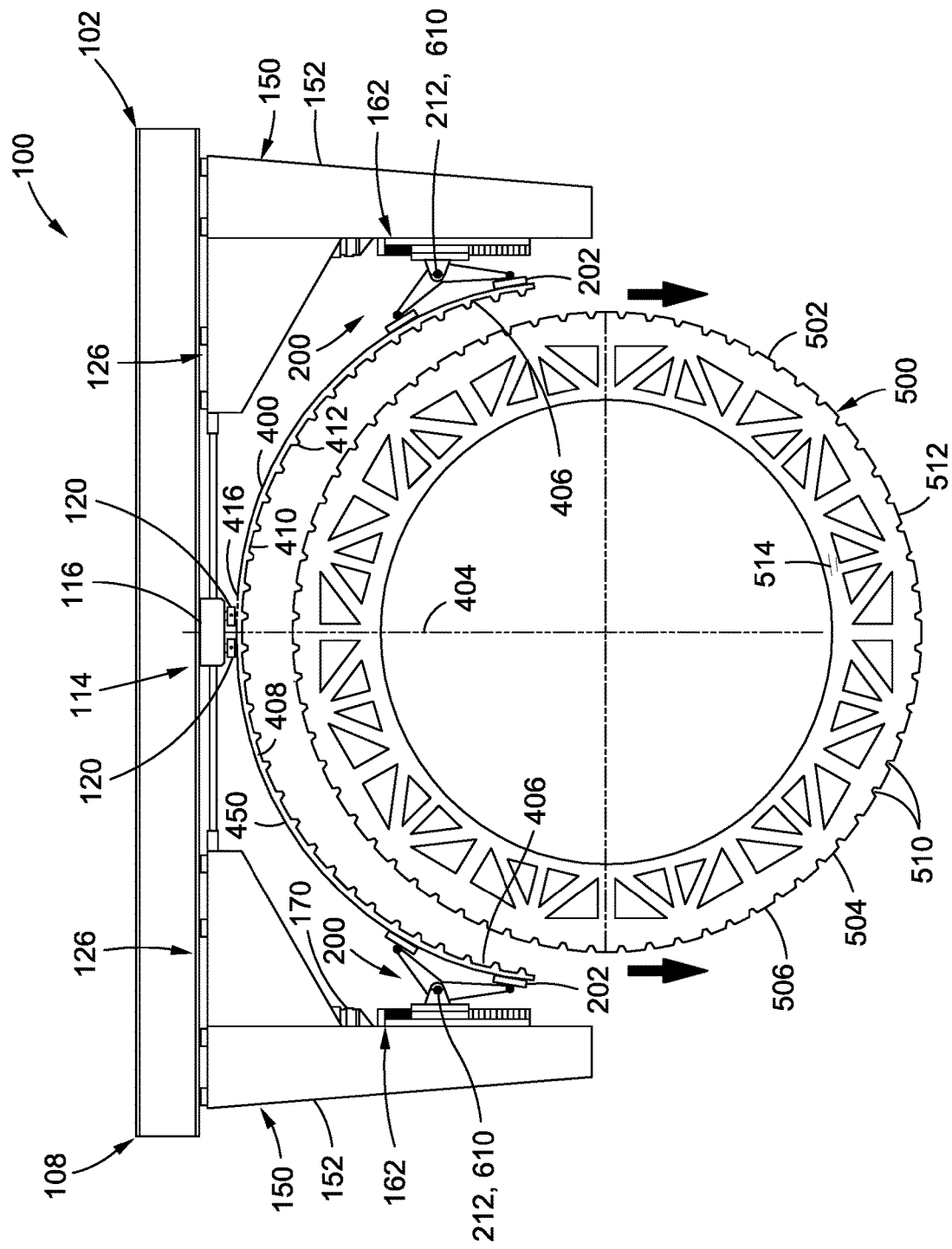
FIG. 25 is a front view of the flay assembly of FIG. 20 after removal of the workpiece from the manufacturing fixture.

Referring to FIGS. 23-24, shown is a front view of the flay assembly 102 illustrating the workpiece side portions 406 after being outwardly deflected by the attachment mechanisms 202 as a result of coordinated movement of the vertical beam assemblies 150 and workpiece attachment assemblies 200. As mentioned above, the horizontal drive motors 136 and the vertical drive motors 170 of each flay assembly 102 in the flay system 100 are operable in a coordinated manner to simultaneously move the vertical beams 152 of each flay assembly 102 away from each other along the horizontal drive axis 134 while moving each workpiece attachment assembly 200 (e.g., upwardly toward the horizontal beam) along the vertical drive axis 168 in a manner causing the attachment mechanisms 202 to pull the workpiece side portions 406 away from the manufacturing fixture 500. The movement of the attachment assemblies causes the workpiece side portions 406 to spread apart while the center support 114 of the horizontal beam 110 maintains the workpiece crown 416 in contact with the manufacturing fixture 500. The center support 114 functions as the point of rotation about which the workpiece side portions 406 are deflected.

In some examples, the horizontal drive motors 136 and the vertical drive motors 170 may be operated in a coordinated manner to outwardly deflect the workpiece side portions 406 along a specific movement path such as an arcuate movement path. The movement path along which the workpiece side portions 406 are outwardly deflected may be defined relative to a specific point or feature on each workpiece attachment assembly 200. For example, the horizontal drive motors 136 and the vertical drive motors 170 of each flay assembly 102 may be operated in a manner causing the attachment assembly pivot joint 212 of each one of the workpiece attachment assemblies 200 to simultaneously move outwardly along a deflection arc 600 of constant radius generally centered at the center support 114 which functions as the center of rotation 604. The center of rotation 604 may be located proximate the intersection of the workpiece inner surface 408 and a vertical plane (not shown) coincident with the longitudinal axis 402 (e.g., an axial centerline) of the workpiece 400 (e.g., a skin panel 450). The attachment mechanisms 202 of the pair of vertical beams assemblies on opposite sides of the manufacturing fixture 500 may be moved along the same arc length 616 (FIGS. 23-24) from the initial position 608 (workpiece 400 in the undeflected state 612—FIGS. 20-21) to a final position 610 in which the workpiece 400 is in a deflected state 614 as shown in FIGS. 23-24. By moving each one of the attachment mechanisms 202 along the deflection arc 600 centered at the center support 114, bending stress in the workpiece 400 may be minimized relative to the bending stress that may otherwise result from moving the workpiece side portions 406 along a non-arcuate movement path.

The horizontal drive motors 136 and the vertical drive motors 170 may be operated according to a numerical control (NC) program executed by a processor 700 communicatively coupled to the horizontal drive motors 136 and the vertical drive motors 170. The horizontal drive motors 136 and the vertical drive motors 170 may be controlled by the processor 700 to simultaneously outwardly deflect the workpiece side portions 406 by equal amounts away from the fixture outer surface 502 and at the same deflection rate. The workpiece side portions 406 may be simultaneously deflected outwardly at least until clearance (shown exaggerated in FIGS. 23-24) exists between the workpiece inner surface 408 and the fixture outer surface 502 on each side of the manufacturing fixture 500 to allow for removal of the workpiece 400 from the manufacturing fixture 500. After removal of the workpiece 400, the manufacturing fixture 500 may be moved (e.g., lowered) away from the flay system 100 and/or the flay system 100 may be moved (e.g., raised) away from the manufacturing fixture 500 as shown in FIG. 25. As mentioned above, after the manufacturing fixture 500 is clear of the flay system 100, the horizontal drive mechanisms 126 and vertical drive mechanisms 162 may be operated in a manner to reverse the direction of the vertical beam assemblies 150 and workpiece attachment assemblies 200 in a manner to move the attachment mechanisms 202 from the final position 610 (workpiece 400 in the deflected state 614—FIGS. 23-25) to the initial position 608 (workpiece 400 in the undeflected state 612—FIGS. 20-21). The flay system 100 may load the workpiece 400 onto a support fixture (not shown) after which the attachment mechanisms 202 may be released from the workpiece side portions 406 allowing the flay system 100 to be transported away.

Figure 26:
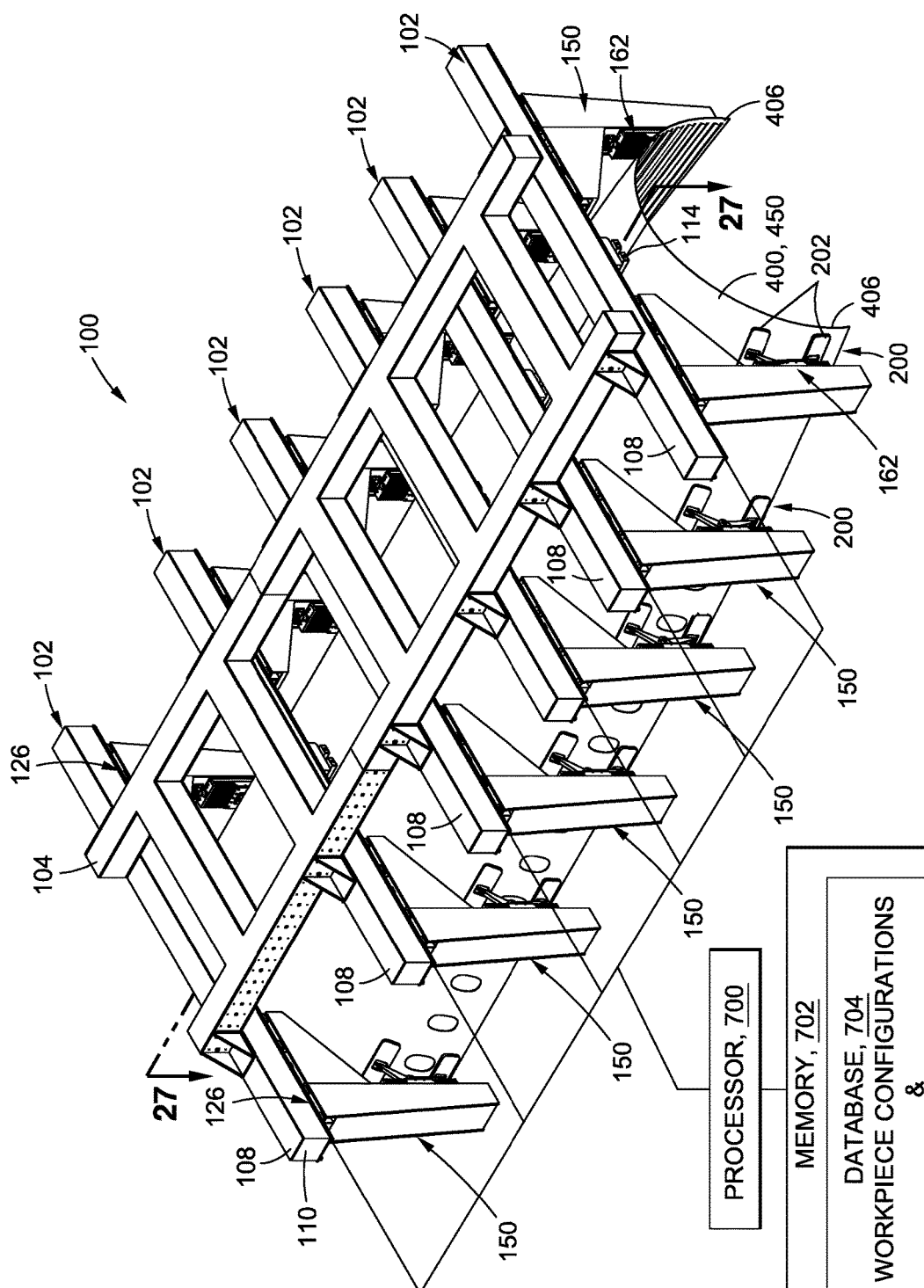
FIG. 26 is a perspective view of a flay system having a processor and a memory for storing a database of workpiece configurations and corresponding program files each defining the movement of the attachment mechanisms.

Referring to FIG. 26, shown is a perspective view of a flay system 100 supporting a workpiece 400 configured as a skin panel 450. The flay system 100 may includes the above-mentioned processor 700 configured to control the horizontal drive motors 136 and the vertical drive motors 170. The flay system 100 may additionally include a memory 702 communicatively coupled to the processor 700 and configured to store a database 704 of workpiece configurations and corresponding program files. For each workpiece configuration, the corresponding program file defines the movement profile of the attachment mechanisms 202 in the flay system 100. Each program file may be configured as a numerical control program that is executable by the processor 700 for commanding the horizontal drive motors 136 and vertical drive motors 170 of the flay system 100 in a manner to control the positions and movements of the attachment mechanisms 202 of all of the flay assemblies 102 that are involved in the removal of a workpiece 400 from a manufacturing fixture 500. Each movement profile defines the positions of the attachment mechanisms 202 during different stages of the removal process such as the pre-attachment position 606 of the attachment mechanisms 202 (e.g., FIG. 19), the initial position 608 (e.g., FIG. 20-22) of the attachment mechanisms 202 when the workpiece 400 is in the undeflected state 612 and is supported on the manufacturing fixture 500, and the final position 610 (e.g., FIG. 23-24) of the attachment mechanisms 202 when the workpiece 400 is in the deflected state 614 after outward deflection of the workpiece side portions 406.

In addition, each movement profile defines the directional path of the attachment mechanisms 202 during movement of the attachment mechanisms 202 from the initial position 608 to the final position 610. As mentioned above, the movement path may be defined as a deflection arc 600 centered approximately at the center support 114. The positions of the attachment mechanisms 202 may be defined in terms of the lateral distance of each attachment mechanism 202 from the flay assembly vertical centerline 106 and the vertical distance of each attachment mechanism 202 from the horizontal beam 110. The program file defines the manner in which the processor 700 controls the horizontal drive motors 136 and vertical drive motors 170 for moving the vertical beam assemblies 150 relative to the horizontal beam 110 and for moving the workpiece attachment assemblies 200 relative to the vertical beam assemblies 150 to achieve the defined positions and movements of the attachment mechanisms 202. In addition, each program file may define the movement rates of the vertical beam assemblies 150 along the horizontal beam assembly 108 and the movement rates of each workpiece attachment assembly 200 along the vertical beam assembly 150, to achieve a desired movement rate of each attachment mechanism 202 along the movement path (e.g., deflection arc 600). The processor 700 may control the flay assemblies 102 in a synchronized manner. For example, the processor 700 may command the horizontal drive motors 136 and vertical drive motors 170 of all flay assemblies 102 in the flay system 100 to initiate movement of the attachment mechanisms 202 to start outward deflection of the workpiece side portion 406 at each flay assembly 102 at approximately the same time (e.g., within several second of each other) at the initial position 608, and to move the attachment mechanisms 202 at approximately the same rate (e.g., within approximately 10 percent of each other), and to stop the attachment mechanisms 202 at approximately the same time (e.g., within several second of each other) at the final position 610.

Referring to FIG. 26-29, for workpieces 400 that have a non-constant cross-sectional shape such as a skin panel 450 that is tapered, the radius of the deflection arc 600 defined by the program file for each flay assembly 102 may be proportional to the local radius of curvature 602 of the workpiece 400 at the axial location of the flay assembly 102 along the longitudinal axis 402. In the example of the skin panel 450 shown in FIG. 26-27, the radius of the deflection arc 600 of the attachment mechanisms 202 may be relatively large at the end of the skin panel 450 having a relatively large radius of curvature 602 (e.g., FIG. 28), and the radius of the deflection arc 600 of the attachment mechanisms 202 may be relatively small at the end of the skin panel 450 having a relatively small radius of curvature 602 (e.g., FIG. 29). In addition, the program file may define the vertical position to which the support pads 120 of the center supports 114 of one or more of the flay assemblies 102 may be adjusted to ensure that the support pads 120 of each flay assembly 102 contact the workpiece crown 416. As mentioned above and shown in FIG. 22, one or more of the support pads 120 may be supported on center support shafts 118 that may be adjustably extendable such as via small actuators (not shown) that may be included with the center support 114. In addition, the program file may define the point in time at which the processor 700 commands the vacuum source (e.g., vacuum pump—not shown) to apply a vacuum to the vacuum plates 208 for attachment to the workpiece outer surface 414 at the workpiece side portions 406.

As mentioned above, the horizontal drive motors 136 and the vertical drive motors 170 may each have a rotary encoder 144 configured to periodically or continuously measure angular motion correspondingly of the horizontal drive motors 136 and the vertical drive motors 170. The rotary encoders 144 may each periodically or continuously generate an encoder signal representative of the angular motion. The processor 700 may be configured to periodically or continuously receive the encoder signal from each rotary encoder 144. The processor 700 may compare the encoder signals generated by each rotary encoder 144 for coordination and synchronization of the horizontal drive motors 136 and vertical drive motors 170. For example, the processor 700 may monitor the movement of substantially all of the attachment mechanisms 202 of the flay system 100 based on the encoder signals and the characteristics of the horizontal drive mechanisms 126 and vertical drive mechanisms 162 such as the thread pitch of the threaded shaft 140, the gear reduction of gearboxes of the horizontal drive motors 136 and vertical drive motors 170, and other characteristics. Based on the encoder signals, the processor 700 may adjust the horizontal drive motors 136 and/or vertical drive motors 170 in a manner maintaining the positions of substantially all of the attachment mechanisms 202 of the flay system 100 to within approximately 10 percent of each other and, more preferably, to within approximately 1 percent of each other. In this manner, the workpiece side portions 406 on each side of the manufacturing fixture 500 may be outwardly deflected in a synchronized and/or coordinated manner In addition, the processor 700 may generate a time-history of outward deflection of the workpiece side portions 406 at each one of the flay assemblies 102 based on the encoder signals. The time-history may be stored in the memory 702 and may define the movement of the workpiece side portions 406 starting from the attachment mechanisms 202 in the initial position 608 (FIGS. 20-23) when the workpiece 400 is in the undeflected state 612, to the final position 610 (FIGS. 23-24) of each attachment mechanism 202 for the workpiece 400 in the deflected state 614 when the workpieces 400 are deflected outwardly from the manufacturing fixture 500 by an amount allowing for removal of the workpiece 400 from the manufacturing fixture 500 without interference between the workpiece 400 and the manufacturing fixture 500. The time history may define the movement path and rate of movement of each attachment mechanism 202 between the initial position 608 to the final position 610 during outward deflection of the opposing workpiece side portions 406. The time-history may facilitate a determination as to whether the outward deflection of the workpiece side portions 406 workpiece 400 was performed within predetermined engineering limits. For example, the time-history may facilitate a determination as to whether the deflection magnitude, deflection rate, and/or movement path of each one of the workpiece side portions 406 during outward deflection was performed within pre-determined engineering limits. The deflection magnitude or deflection distance or amount may be based on the distance of travel of the attachment mechanism 202 from the initial position 608 (e.g., FIG. 20-21) to the final position 610 (e.g., FIG. 23-24). The deflection rate may be based on the amount of elapsed time between the initial position 608 and the final position 610. The movement path may be defined in terms of the radius of the deflection arc 600 relative to the center of rotation 604 at the center support 114. By confirming that the deflection of the workpiece 400 was performed within engineering limits, time-consuming inspection (e.g., ultrasonic inspection) of the workpiece 400 may be avoided.

FIG. 30 is a flowchart including operations of a method 800 of removing a workpiece 400 from a manufacturing fixture 500 using a flay system 100. The method may initially include supporting the flay system 100 above the workpiece 400 using a support system 300. For example, as shown in FIG. 7-8, the method may include supporting the flay system 100 on a floor surface 304 using a floor stand 302 coupled to the flay system 100. Alternatively, the method may include suspending the flay system 100 from a hoist cable 316 using a longitudinal beam 314 coupling the flay system 100 to the hoist cable 316 as shown in FIG. 9. The method may additionally include operating the horizontal drive motors 136 and vertical drive motors 170 of the flay assemblies 102 to position each one of the attachment mechanisms 202 at a pre-attachment position 606 (FIG. 19) in which the vertical beams 152 assemblies are spaced apart at a distance that provides clearance between the workpiece side portions 406 and the manufacturing fixture 500. In addition, the attachment mechanisms 202 may be vertically positioned at a vertical location that corresponds to the location where the attachment mechanisms 202 will be coupled to the workpiece side portions 406 when the center support 114 is in contact with the workpiece crown 416. The method may additionally include positioning the flay system 100 relative to the manufacturing fixture 500 to facilitate the initial engagement of the attachment mechanisms 202 to the workpiece side portions 406. For example, as shown in FIG. 19, the manufacturing fixture 500 may be vertically raised until positioned between the vertical beam assemblies 150. In an embodiment, the manufacturing fixture 500 may be raised using one or more vertical lifting mechanism (not shown) that may be included with the manufacturing fixture 500. Alternatively or additionally, the flay system 100 may be lowered into position around the manufacturing fixture 500 such that the vertical beam assemblies 150 are positioned in spaced relation to opposite sides of the manufacturing fixture 500.

Step 802 of the method 800 includes positioning the center support 114 of a horizontal beam assembly 108 of the flay assemblies 102 of a flay system 100 into contact with the workpiece crown 416 of the workpiece 400 supported on a manufacturing fixture 500 as shown in FIG. 20. In this regard, the center support 114 may be moved into contact with the workpiece crown 416 as part of the process of positioning the flay system 100 relative to the manufacturing fixture 500. Referring to FIG. 22, step 802 of positioning the center support 114 into contact with the workpiece crown 416 may include orienting the support pads 120 of the center support 114 until locally tangent to the workpiece outer surface 414 at the workpiece crown 416. As mentioned above, the center support 114 may be centered between the pair of vertical beam assemblies 150 and the support pads 120 may be configured or may be orientable (via the pad pivot axes 124—FIG. 22) such that the support pad 120 is locally tangent to the workpiece outer surface 414 at the workpiece crown 416. For examples of the flay system 100 configured for removing a workpiece 400 having a cross-section that varies along the longitudinal axis 402 (e.g., the skin panel 450 of FIG. 26), the step 802 of positioning the center support 114 into contact with the workpiece crown 416 may include adjusting the vertical position of one or more support pads 120 using the center support shafts 118 (FIG. 22). As mentioned above, such center support shafts 118 may be vertically extendable from the center support block 116 and may allow for vertical adjustment of the vertical position of the support pads 120 such that all of the support pads 120 of the flay system 100 may be placed in contact with the workpiece outer surface 414 at the workpiece crown 416. The adjustability of the vertical position of each support pad 120 may accommodate workpieces 400 for which the distance from the workpiece crown 416 to the horizontal beam 110 varies along a longitudinal axis 402 of the workpiece 400 (e.g., FIG. 28-29).

Step 804 of the method 800 includes removably attaching a pair of attachment mechanisms 202 of the flay assemblies 102 respectively to opposing workpiece side portions 406 of the workpiece 400 as shown in FIGS. 20-21. As described above, each workpiece attachment assembly 200 is movably coupled to a vertical beam track system 166 of a vertical beam assembly 150. In addition, each workpiece attachment assembly 200 is operably engaged to a vertical drive motor 170 of a vertical beam assembly 150. As described above, each vertical beam assembly 150 has a vertical beam 152 with a vertical beam top portion 154 that is movably coupled to a horizontal beam track system 128 of the horizontal beam assembly 108. In addition, each vertical beam assembly 150 is operably engaged to a horizontal drive motor 136 of the horizontal beam assembly 108 for moving the vertical beam assembly 150 along the horizontal drive axis 134.

In some examples, the step 804 of removably attaching the pair of attachment mechanisms 202 respectively to opposing workpiece side portions 406 may include attaching, using vacuum pressure, at least one vacuum plate 208 (e.g., FIG. 14-18) to each of the opposing workpiece side portions 406. As described above, each vacuum plate 208 may have an array of vacuum cups (not shown) that are fluidly coupled to a vacuum source (not shown) for vacuum attachment of the vacuum plate 208 to the workpiece outer surface 414 at the workpiece side portion 406. The step of attaching at least one vacuum plate 208 to a workpiece side portion 406 may include attaching a pair of vacuum plates 208 to each one of the workpiece side portions 406 as shown in FIG. 21. The attachment of the attachment mechanisms 202 to the workpiece side portions 406 may be facilitated by allowing the attachment mechanisms 202 to pivot relative to the vertical beam assembly 150 as described above with regard to FIG. 14-18. For example, the method may include limiting movement of the vacuum plates 208 to pivoting motion about a roll axis 214 as shown in FIG. 18. As described above, each workpiece attachment assembly 200 may include a pivot bracket 204 coupled to the vertical drive mechanism 162 by an attachment assembly pivot joint 212.

A vacuum plate 208 may be mounted on the free end of each one of the pair of pivot arms 206 of the pivot bracket 204.

For workpiece attachment assemblies 200 that have a pivot bracket 204, the method may include limiting movement of the pivot bracket 204 to pivoting motion about a roll axis 214 and a yaw axis 216 of the attachment mechanism 202 as shown in FIGS. 17-18. Allowing the attachment mechanisms 202 (e.g., vacuum plates 208) and/or the pivot bracket 204 to pivot about the roll axis 214 and yaw axis 216 may allow the attachment mechanisms 202 to pivot into an orientation that is tangent to the workpiece outer surface 414 during engagement of the attachment mechanisms 202 to the workpiece side portions 406. For embodiments in which the attachment mechanisms 202 are configured as vacuum plates 208, the ability of the vacuum plates 208 and/or pivot bracket 204 to pivot about the roll axis 214 and yaw axis 216 may allow the vacuum plates 208 to form a vacuum tight seal against the workpiece outer surface 414. Preventing the attachment mechanisms 202 and/or the pivot bracket 204 from pivoting about a pitch axis may avoid the attachment mechanisms 202 (e.g., vacuum plates 208) from being oriented in a skewed direction during engagement of the attachment mechanisms 202 to the workpiece side portions 406, and which would otherwise prevent the vacuum plates 208 from sealing to the workpiece outer surface 414 of the workpiece side portions 406 during the application of vacuum pressure to the vacuum plates 208.

With the center support 114 in contact with the workpiece crown 416 and with the attachment mechanisms 202 of each flay assembly 102 coupled to the workpiece side portions 406, step 806 of the method 800 includes operating the horizontal drive motors 136 and the vertical drive motors 170 of the flay assemblies 102 in a coordinated manner to move the vertical beam assemblies 150 away from each other along a horizontal drive axis 134 while simultaneously moving each workpiece attachment assembly 200 along the corresponding vertical drive axis 168 in a manner causing the pair of attachment mechanisms 202 to outwardly deflect the workpiece side portions 406 away from the manufacturing fixture 500 while the center support 114 of the horizontal beam assembly 108 maintains the workpiece crown 416 in contact with the manufacturing fixture 500. For the example flay system 100 illustrated in the figures, step 806 of operating at least one horizontal drive motor 136 and the vertical drive motors 170 in a coordinated manner may respectively include rotating a threaded shaft 140 (e.g., FIG. 13) of the horizontal beam assembly 108 using a horizontal drive motor 136, and converting rotation of the threaded shaft 140 of the horizontal beam assembly 108 into linear motion of the pair of vertical beam assemblies 150 (e.g., FIG. 13) of each flay assembly 102 along a horizontal drive axis 134 using a pair of nuts 142 engaged to the threaded shaft 140 and respectively coupled to the pair of vertical beam assemblies 150, and rotating a pair of threaded shafts 140 (e.g., FIG. 15) respectively of the pair of vertical beam assemblies 150 using a pair of vertical drive motors 170 (e.g., FIG. 14-15), and converting rotation of the threaded shaft 140 of each vertical beam assembly 150 into linear motion of one of the workpiece attachment assemblies 200 (e.g., FIGS. 14-18) along the corresponding vertical drive axis 168 using a nut 142 (e.g., FIG. 18) engaged to the threaded shaft 140 of the vertical beam assembly 150 and respectively coupled to one of the workpiece attachment assemblies 200. As described above, the horizontal drive motors 136 and the vertical drive motors 170 may be configured as servo-motors each having a gearbox rotatably coupled to a threaded shaft 140. The horizontal drive motors 136 and vertical drive motors 170 may be operated under command of the processor 700 executing the above-described program file.

The step 806 of operating the horizontal drive motors 136 and the vertical drive motors 170 in a coordinated manner may include operating the horizontal drive motor 136 and the vertical drive motors 170 in a coordinated manner to cause movement of the attachment assembly pivot joint 212 of each workpiece attachment assembly 200 along a deflection arc 600 during outward deflection of the workpiece side portions 406. As described above, the deflection arc 600 on each side of the flay assembly 102 may be generally centered at a center of rotation 604 located at the center support 114. More specifically, the horizontal drive motors 136 and vertical drive motors 170 may be operated in a manner to cause the roll axis 214 (e.g., FIG. 17-18) of the attachment assembly pivot joint 212 to move along a deflection arc 600. As described above, the center of rotation 604 may be located at the intersection of the workpiece inner surface 408 and a vertical plane (not shown) coincident with a longitudinal axis 402 (e.g., an axial centerline) of the workpiece 400. The deflection arc 600 along which each attachment assembly pivot joint 212 moves may be an arc of constant radius that is centered at the center of rotation 604. It should be noted that as an alternative to defining the movement path of the workpiece attachment assembly 200 in terms of the movement path of the roll axis 214 of the attachment assembly pivot joint 212, the movement path of the workpiece attachment assembly 200 may be defined in terms of any one a variety of other geometric features of the workpiece attachment assembly 200, and is not limited to the roll axis 214 of the attachment assembly pivot joint 212.

As described above and illustrated in the figures, the flay system 100 may include a plurality of flay assemblies 102 arranged in spaced parallel relation to each other as shown in FIGS. 7, 10, 26 and 27. Step 806 of operating the horizontal drive motor 136 and the vertical drive motors 170 in a coordinated manner may include controlling, using the processor 700, the horizontal drive mechanisms 126 and vertical drive mechanisms 162 of all of the flay assemblies 102 in a synchronized manner such that outward deflection of the workpiece side portions 406 at each flay assembly 102 starts at substantially (e.g., within several seconds of each other) the same time when the workpiece side portions 406 are in the undeflected state 612 (e.g., FIGS. 20-21). In addition, the horizontal drive motors 136 and the vertical drive motors 170 of the flay assemblies 102 may be controller to operate in a synchronized manner causing the workpiece side portions 406 to outward deflect at substantially (e.g., within 10 percent of each other) the same deflection rate, and to stop outwardly deflecting at substantially the same time (e.g., within several seconds of each other). By synchronizing the operation of the horizontal drive motors 136 and vertical drive motors 170 of the flay assemblies 102 of the flay system 100, the workpiece side portions 406 may be outwardly deflected in a manner that avoids generating excessive internal stress in the workpiece 400 that may be otherwise caused if the workpiece side portions 406 at one or more flay assemblies 102 started and/or stopped at different times than the outward deflection of the workpiece side portions 406 at other flay assemblies 102 in the flay system 100.

Referring to FIG. 26, the method 800 may include storing, in a memory 702 communicatively coupled to a processor 700, a database 704 of one or more workpiece 400 configurations and corresponding program files defining for each workpiece 400 configuration in the database 704 a movement profile of all of the attachment mechanisms 202 in the flay system 100. The method may include retrieving one of the movement profiles from the memory 702 for use by the processor 700 in controlling the horizontal drive motors 136 and the vertical drive motors 170 of a flay system 100 for use in the process of removing a workpiece 400 from a manufacturing fixture 500. In this regard, each program file may be executed by the processor 700 for controlling the horizontal drive motors 136 and the vertical drive motors 170 to achieve the positions of the attachment mechanism 202 required for attachment of the attachment mechanisms 202 to the workpiece 400. In some examples, a program file executed by a processor 700 may provide for adjustment of the vertical position of one or more of the center supports 114 which, as described above, may be adjusted via the center support shafts 118 which optionally may be extendable from the center support block 116 (e.g., FIG. 22) to ensure that the center supports 114 of each one of the flay assemblies 102 contact the workpiece crown 416, as may be required for workpieces 400 that have a cross-sectional shape or size that varies along the longitudinal axis 402 (e.g., FIG. 26). In addition, the program files by which the processor 700 controls the horizontal drive motor 136 and the vertical drive motors 170 may define the movement paths (e.g., deflection arc 600) of the attachment mechanisms 202 from the initial position 608 to the final position 610 of the attachment mechanisms 202, as shown in FIG. 23.

In some examples, the method may include measuring angular motion of the horizontal drive motor 136 and the vertical drive motors 170 using a rotary encoder 144 coupled to each of the horizontal drive motor 136 and vertical drive motors 170, and generating at each rotary encoder 144 an encoder signal representative of the angular motion. As described above, the rotary encoder 144 for each one of the horizontal drive motors 136 and vertical drive motors 170 may be configured to continuously or periodically generate encoder signals for receipt by the processor 700. The method may further include determining, using the processor 700 receiving encoder signals from each rotary encoder 144, a motion of each of the attachment mechanisms 202 as a proxy for defining the motion of the workpiece side portions 406. For example, as described above, the motion of the attachment mechanisms 202 may be described in terms of the motion of the roll axis 214 (e.g., FIG. 17-18) of the attachment assembly pivot joint 212 of each workpiece 400 attach assembly, although any one a variety of other geometric features of the workpiece attachment assembly 200 may be used to define the motion of the attachment mechanisms 202. The method may additionally include generating, based on the motion of the attachment mechanisms 202, a time-history of outward deflection of each of the workpiece side portions 406 starting from the initial position 608 of each attachment mechanism 202 (e.g., FIG. 20-21) for the workpiece 400 in the undeflected state 612, to the final position 610 of each attachment mechanism 202 (e.g., FIGS. 23-24) for the workpiece 400 in the deflected state 614.

As mentioned above, the workpiece side portions 406 are preferably deflected outwardly by an amount that allows the workpiece 400 to be removed from the manufacturing fixture 500 without interference between the workpiece 400 and the manufacturing fixture 500. The method may additionally include removing the workpiece 400 from the manufacturing fixture 500 as shown in FIG. 25 such as by moving the manufacturing fixture 500 downwardly while supporting the flay system 100 and workpiece 400 using a floor stand 302 (e.g., FIG. 9) or suspending the flay system 100 from a hoist cable 316 (e.g., FIG. 10). After removal of the workpiece 400 from the manufacturing fixture 500, the method may additionally include moving the workpiece 400 from the deflected state 614 back to the undeflected state 612 by moving each one of the attachment mechanisms 202 from the final position 610 (FIG. 24) back to the initial position 608 (FIG. 21), and releasing the attachment mechanisms 202 from the workpiece side portions 406 when the workpiece 400 is supported on a surface (not shown) or a support fixture (not shown).

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A flay system for separating a workpiece from a manufacturing fixture, comprising:
    at least one flay assembly, including:
        a horizontal beam assembly, including:
            a horizontal beam having a center support;
            a horizontal drive mechanism mounted to the horizontal beam and having a horizontal drive motor and a horizontal beam track system defining a horizontal drive axis;
        a pair of vertical beam assemblies mounted to the horizontal beam assembly in spaced relation to each other, each vertical beam assembly including:
            a vertical beam having a vertical beam top portion coupled to the horizontal beam track system and operably engaged to the horizontal drive motor for driving the vertical beam assembly along the horizontal drive axis;
            a vertical drive mechanism mounted to the vertical beam and having a vertical drive motor and a vertical beam track system defining a vertical drive axis;
            a workpiece attachment assembly coupled to the vertical beam track system and operably engaged to the vertical drive motor for driving the workpiece attachment assembly along the vertical drive axis;
            the workpiece attachment assembly including an attachment mechanism configured to be removably attached to one of opposing workpiece side portions of a workpiece supported on a manufacturing fixture; and
    the horizontal drive motor and the vertical drive motors configured to operate in a coordinated manner to move the vertical beams away from each other along the horizontal drive axis while simultaneously moving each workpiece attachment assembly along a corresponding vertical drive axis to cause the attachment mechanisms to pull the workpiece side portions away from the manufacturing fixture.

2. The flay system of claim 1, wherein:
    the horizontal drive mechanism of the horizontal beam assembly and the vertical drive mechanism of each of the vertical beam assemblies include a threaded shaft rotatably driven respectively by the horizontal drive motor and the vertical drive motor;
    the vertical beam top portion of each vertical beam having a drive fitting coupled to a nut engaged to the threaded shaft of the horizontal drive mechanism for converting rotation of the threaded shaft into linear motion of the vertical beam along the horizontal drive axis; and the workpiece attachment assembly of each vertical beam assembly having a drive fitting coupled to a nut engaged to the threaded shaft of the vertical drive mechanism for converting rotation of the threaded shaft into linear motion of the workpiece attachment assembly along the vertical drive axis.

3. The flay system of claim 1, wherein:
the horizontal drive motor and the vertical drive motors are operable in a coordinated manner to cause the attachment mechanism of each workpiece attachment assembly to move outwardly along a deflection arc generally centered at an intersection of a workpiece inner surface and a vertical plane that is coincident with a longitudinal axis of the workpiece.

4. The flay system of claim 1, wherein:
the workpiece attachment assembly includes an attachment assembly pivot joint coupling the attachment mechanism to the vertical drive mechanism; and
the attachment assembly pivot joint limiting movement of the attachment mechanism to pivoting about a roll axis and a yaw axis of the attachment mechanism.

5. The flay system of claim 1, wherein the attachment mechanism comprises:
at least one vacuum plate having an array of vacuum cups fluidly coupled to a vacuum source for vacuum attachment of the workpiece attachment assembly to a workpiece outer surface at the workpiece side portion.

6. The flay system of claim 1, further including:
a center support centered between the pair of vertical beam assemblies and having at least one support pad extending outwardly from the horizontal beam and configured to be locally tangent to a workpiece outer surface at a workpiece crown.

7. The flay system of claim 1, further including:
a rotary encoder coupled to each one of the horizontal drive motor and the vertical drive motor and configured to measure angular motion respectively of the horizontal drive motor and the vertical drive motor, and generate an encoder signal representative thereof; and
a processor configured to receive the encoder signal from each rotary encoder, determine a motion of each of the attachment mechanisms, and generate a time-history of outward deflection of each of the workpiece side portions from an initial position of each attachment mechanism to a final position of each attachment mechanism.

8. The flay system of claim 1, wherein:
the at least one flay assembly comprises a plurality of flay assemblies arranged in spaced parallel relation to each other; and
the horizontal drive mechanisms and the vertical drive mechanisms of the flay assemblies are operated in a synchronized manner to start outward deflection of the workpiece side portions at each flay assembly at approximately the same time.

9. The flay system of claim 1, further including:
a processor;
a memory communicatively coupled to the processor and configured to store a database of one or more workpiece configurations and corresponding program files defining a movement profile of the attachment mechanisms of the flay system; and
the processor configured to execute one of the program files for controlling the horizontal drive mechanisms and vertical drive mechanisms for moving the attachment mechanisms according to the movement profile.

10. A flay system for separating a workpiece from a manufacturing fixture, comprising:
a plurality of flay assemblies, each including:
a horizontal beam assembly, including:
a horizontal beam having a center support;
a pair of horizontal drive mechanisms mounted to the horizontal beam and each having a horizontal drive motor and a horizontal beam track system defining a horizontal drive axis;
a pair of vertical beam assemblies mounted to the horizontal beam assembly in spaced relation to each other, each vertical beam assembly including:
a vertical beam having a vertical beam top portion coupled to the horizontal beam track system and operably engaged to the horizontal drive motor of one of the horizontal drive mechanisms for driving the vertical beam assembly along the horizontal drive axis;
a vertical drive mechanism mounted to the vertical beam and having a vertical drive motor and a vertical beam track system defining a vertical drive axis;
a workpiece attachment assembly coupled to the vertical beam track system and operably engaged to the vertical drive motor for driving the workpiece attachment assembly along the vertical drive axis;
the workpiece attachment assembly including an attachment mechanism configured to be removably attached to one of opposing workpiece side portions of a workpiece supported on a manufacturing fixture; and
the horizontal drive motors and the vertical drive motors configured to operate in a coordinated manner to move the vertical beams away from each other along the horizontal drive axis while simultaneously moving each workpiece attachment assembly along a corresponding vertical drive axis to cause the attachment mechanisms to pull the workpiece side portions away from the manufacturing fixture while the center support maintains a workpiece crown in contact with the manufacturing fixture.

11. A method of separating a workpiece from a manufacturing fixture, comprising:
positioning a center support of a horizontal beam assembly of at least one flay assembly of a flay system into contact with a workpiece crown of a workpiece having an inner surface geometry supported on a manufacturing fixture;
removably attaching a pair of attachment mechanisms of a corresponding pair of workpiece attachment assemblies respectively to opposing workpiece side portions of the workpiece, each workpiece attachment assembly being movably coupled to a vertical beam track system and operably engaged to a vertical drive motor of a vertical drive mechanism of a vertical beam assembly, each vertical beam assembly coupled to a horizontal beam track system and operably engaged to a horizontal drive motor of a horizontal drive mechanism of the horizontal beam assembly; and
operating the horizontal drive motor and the vertical drive motors in a coordinated manner to move the vertical beam assemblies away from each other along a horizontal drive axis while simultaneously moving each workpiece attachment assembly along a corresponding vertical drive axis to cause the pair of attachment mechanisms to outwardly deflect the workpiece side portions away from the manufacturing fixture.

12. The method of claim 11, wherein the step of operating the horizontal drive motor and the vertical drive motors in a coordinated manner includes:
rotating a threaded shaft of the horizontal beam assembly using the horizontal drive motor, and converting rotation of the threaded shaft of the horizontal beam assembly into linear motion of a pair of the vertical beam assemblies along the horizontal drive axis using a pair of nuts engaged to the threaded shaft and respectively coupled to the pair of vertical beam assemblies; and
rotating a pair of threaded shafts respectively of the pair of vertical beam assemblies using a pair of vertical drive motors, and converting rotation of the threaded shaft of each vertical beam assembly into linear motion of one of the workpiece attachment assemblies along the corresponding vertical drive axis using a nut engaged to the threaded shaft of the vertical beam assembly and respectively coupled to one of the workpiece attachment assemblies.

13. The method of claim 11, wherein the step of operating the horizontal drive motor and the vertical drive motors in a coordinated manner includes:
operating the horizontal drive motor and the vertical drive motors in a coordinated manner to cause the attachment mechanism of each workpiece attachment assembly to simultaneously move outwardly along a deflection arc generally centered at an intersection of a workpiece inner surface and a vertical plane that is coincident with a longitudinal axis of the workpiece.

14. The method of claim 11, wherein each workpiece attachment assembly includes an attachment assembly pivot joint coupling the attachment mechanism to the corresponding vertical drive mechanism, the method further including:
limiting, using an attachment assembly pivot joint of each workpiece attachment assembly, movement of the attachment mechanism to pivoting about a roll axis and a yaw axis of the attachment mechanism.

15. The method of claim 11, wherein the step of removably attaching a pair of attachment mechanisms respectively to opposing workpiece side portions of the workpiece comprises:
attaching, using vacuum pressure, at least one vacuum plate to each of the opposing workpiece side portions.

16. The method of claim 11, wherein the step of positioning the center support into contact with the workpiece crown includes:
orienting a support pad locally tangent to a workpiece outer surface at the workpiece crown when the workpiece attachment assemblies are attached respectively to the opposing workpiece side portions.

17. The method of claim 11, further including:
measuring angular motion of the horizontal drive motor and the vertical drive motors using a rotary encoder coupled thereto, and generating at each rotary encoder an encoder signal representative thereof;
determining, using a processor receiving the encoder signal from each rotary encoder, a motion of each of the attachment mechanisms; and
generating, based on the motion of the attachment mechanisms, a time-history of outward deflection of each of the workpiece side portions starting from an initial position of each attachment mechanism to a final position of each attachment mechanism.

18. The method of claim 11, wherein the flay system includes a plurality of flay assemblies arranged in spaced parallel relation to each other, the step of operating the horizontal drive motor and the vertical drive motors in a coordinated manner including:
controlling, using a processor, the horizontal drive mechanisms and vertical drive mechanisms of all of the flay assemblies in a synchronized manner such that outward deflection of the workpiece side portions at each flay assembly starts at approximately the same time.

19. The method of claim 11, further including:
storing, in a memory communicatively coupled to a processor, a database of one or more workpiece configurations and corresponding program files defining for each workpiece configuration in the database a movement profile of all of the attachment mechanisms in the flay system; and
retrieving one of the movement profiles from the memory for use by the processor in controlling the horizontal drive motor and the vertical drive motors for removal of the workpiece from the manufacturing fixture.

20. The method of claim 11, wherein:
the workpiece is a skin panel; and
the manufacturing fixture is a layup mandrel.

* * * * *